(12) United States Patent
Wang et al.

(10) Patent No.: US 12,078,848 B2
(45) Date of Patent: Sep. 3, 2024

(54) OPTICAL MODULE

(71) Applicant: Hisense Broadband Multimedia Technologies Co., Ltd., Shandong (CN)

(72) Inventors: Fenglai Wang, Shandong (CN); Wei Cui, Shandong (CN); Xuejian Li, Shandong (CN); Yan Zhong, Shandong (CN); Hongchao Pan, Shandong (CN); Sigeng Yang, Shandong (CN); Xuxia Liu, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 359 days.

(21) Appl. No.: 17/491,465

(22) Filed: Sep. 30, 2021

(65) Prior Publication Data
US 2022/0019031 A1   Jan. 20, 2022

Related U.S. Application Data

(63) Continuation-in-part of application No. PCT/CN2020/131929, filed on Nov. 26, 2020, and a
(Continued)

(30) Foreign Application Priority Data

Mar. 5, 2020 (CN) .......................... 202010146818.X
Mar. 12, 2020 (CN) .......................... 202010172733.9
(Continued)

(51) Int. Cl.
G02B 6/38   (2006.01)
G02B 6/42   (2006.01)
H04B 10/25  (2013.01)

(52) U.S. Cl.
CPC ......... G02B 6/3838 (2013.01); G02B 6/3897 (2013.01); G02B 6/4292 (2013.01); H04B 10/25891 (2020.05); G02B 6/428 (2013.01)

(58) Field of Classification Search
CPC .. G02B 6/3838; G02B 6/3897; G02B 6/4292; G02B 6/428; G02B 6/4214;
(Continued)

(56) References Cited

U.S. PATENT DOCUMENTS 4,927,228 A   5/1990   Van De Pas
6,234,688 B1  5/2001   Boger et al.
(Continued)

FOREIGN PATENT DOCUMENTS

CN   1258011 A    6/2000
CN   202362502 U  8/2012
(Continued)

OTHER PUBLICATIONS

First Office Action issued in corresponding Chinese Patent Application No. 202010172733.9 dated Jan. 28, 2021, with English translation.
(Continued)

*Primary Examiner* — Michael P Mooney
(74) *Attorney, Agent, or Firm* — Morgan, Lewis & Bockius LLP

(57) ABSTRACT

An optical module includes a shell, a circuit board, a light-emitting chip, a lens assembly, an optical fiber ferrule assembly and a fastener. The fastener fixes the optical fiber ferrule assembly to the lens assembly. The fastener includes a fastening body, a first clamping portion and a second clamping portion. The first clamping portion is disposed at one end of the fastening body, and is clamped with the optical fiber ferrule assembly. The second clamping portion
(Continued)

is disposed at the other end of the fastening body, and is clamped with the lens assembly.

14 Claims, 17 Drawing Sheets

Related U.S. Application Data continuation-in-part of application No. PCT/CN2020/130671, filed on Nov. 20, 2020.

(30) Foreign Application Priority Data

| Mar. 18, 2020 | (CN) | 202010189843.6 |
|---|---|---|
| Jul. 31, 2020 | (CN) | 202010757195.X |
| Jul. 31, 2020 | (CN) | 202010757895.9 |

(58) Field of Classification Search
CPC .... G02B 6/4246; G02B 6/3879; G02B 6/389; G02B 6/421; G02B 6/4219; H04B 10/25891

See application file for complete search history.

(56) References Cited

U.S. PATENT DOCUMENTS

| 6,240,229 | B1 | 5/2001 | Roth |
| 2012/0099870 | A1 | 4/2012 | Luo et al. |
| 2014/0348468 | A1 | 11/2014 | Lagziel et al. |
| 2016/0246019 | A1* | 8/2016 | Ishii .................... G02B 6/4246 |
| 2016/0266340 | A1 | 9/2016 | Zhang et al. |
| 2017/0363827 | A1 | 12/2017 | Yang et al. |
| 2018/0011256 | A1 | 1/2018 | Yodogawa et al. |
| 2021/0149132 | A1 | 5/2021 | Li et al. |

FOREIGN PATENT DOCUMENTS

| CN | 202886656 U | 4/2013 |
| CN | 203811851 U | 9/2014 |
| CN | 104101956 A | 10/2014 |
| CN | 105911652 A | 8/2016 |
| CN | 106597616 A | 4/2017 |
| CN | 106646779 A | 5/2017 |
| CN | 107045166 A | 8/2017 |
| CN | 107076934 A | 8/2017 |
| CN | 107567593 A | 1/2018 |
| CN | 108279464 A | 7/2018 |
| CN | 108398751 A | 8/2018 |
| CN | 109031549 A | 12/2018 |
| CN | 109407230 A | 3/2019 |
| CN | 109669247 A | 4/2019 |
| CN | 110471148 A | 11/2019 |
| CN | 110488433 A | 11/2019 |
| CN | 110542957 A | 12/2019 |
| CN | 110673271 A | 1/2020 |
| CN | 210119608 U | 2/2020 |
| CN | 210119611 U | 2/2020 |
| CN | 111239930 A | 6/2020 |
| CN | 111239934 A | 6/2020 |
| JP | H02-27307 A | 1/1990 |
| JP | H08-297222 A | 11/1996 |
| JP | 109-197186 A | 7/1997 |
| JP | 2000-352645 A | 12/2000 |
| JP | 2001-242341 A | 9/2001 |
| JP | 2004-012516 A | 1/2004 |
| JP | 2006-308907 A | 11/2006 |
| JP | 2019-113713 A | 7/2019 |
| WO | 2017/136437 A1 | 8/2017 |

OTHER PUBLICATIONS

First Office Action issued in corresponding Chinese Patent Application No. 20200189843.6 dated Mar. 1, 2021, with English translation.
Second Office Action issued in corresponding Chinese Patent Application No. 202010172733.9 dated Jul. 2, 2021, with English translation.
Notification to Grant Patent Right for Invention issued in corresponding Chinese Patent Application No. 202010189643.6 dated Aug. 5, 2021, with English translation.
International Search Report and Written Opinion issued in corresponding International Application No. PCT/CN2020/130671 dated Apr. 27, 2021, with English translation.
International Search Report and Written Opinion issued in corresponding International Application No. PCT/CN2020/131929 dated Mar. 1, 2021, with English translation.
Office Action issued in corresponding Chinese Patent Application No. 202010146818.X issued Jun. 21, 2022, with English translation.
Office Action issued in corresponding Chinese Patent Application No. 202010757195.X issued Jun. 8, 2022, with English translation.
Office Action issued in corresponding Chinese Patent Application No. 202010757895.9 issued Jun. 6, 2022, with English translation.

\* cited by examiner

OPTICAL MODULE

CROSS-REFERENCE TO RELATED APPLICATIONS

This application is a continuation-in-part of International Application No. PCT/CN2020/130671, with an international filing date of Nov. 20, 2020, which claims the priority to Chinese Patent Application No. 202010757895.9, filed Jul. 31, 2020 and Chinese Patent Application No. 202010757195.X, filed Jul. 31, 2020; and this application is a continuation-in-part of International Application No. PCT/CN2020/131929, with an international filing date of Nov. 26, 2020, which claims the priority to Chinese Patent Application No. 202010146818.X, filed Mar. 5, 2020, Chinese Patent Application No. 202010189843.6, filed Mar. 18, 2020, and Chinese Patent Application No. 202010172733.9, filed Mar. 12, 2020. The entire contents of the foregoing applications are hereby incorporated by reference herein.

TECHNICAL FIELD

The present disclosure relates to the field of optical communication technologies, and in particular, to an optical module.

BACKGROUND

In optical fiber communication system, an optical module plays a role of achieving interconversion between an optical signal and an electrical signal. The optical module generally includes an optical transmitter, an optical receiver and other devices. The optical transmitter is used to convert the electrical signal into the optical signal and then transmit the optical signal through an optical fiber, and the optical receiver is used to convert the optical signal transmitted by the optical fiber into the electrical signal.

SUMMARY

An optical module is provided. The optical module includes a shell, a circuit board, a light-emitting chip, a lens assembly, an optical fiber ferrule assembly and a fastener. The circuit board is disposed in the shell. The light-emitting chip is disposed on the circuit board and is configured to generate an optical signal. The lens assembly is disposed on the circuit board, covers the light-emitting chip, and is configured to change a propagation direction of an optical signal incident to the lens assembly from the light-emitting chip. An end of the optical fiber ferrule assembly is connected to the lens assembly, and the optical fiber ferrule assembly is configured to transmit an optical signal incident to the optical fiber ferrule assembly from the lens assembly. The fastener fixes the optical fiber ferrule assembly to the lens assembly. The fastener includes a fastening body, a first clamping portion and a second clamping portion. The first clamping portion is disposed at an end of the fastening body and is clamped with the optical fiber ferrule assembly. The second clamping portion is disposed at another end of the fastening body and is clamped with the lens assembly.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual dimensions of products, actual processes of methods and actual timings of signals involved in the embodiments of the present disclosure.

DETAILED DESCRIPTION

Figure 1A:
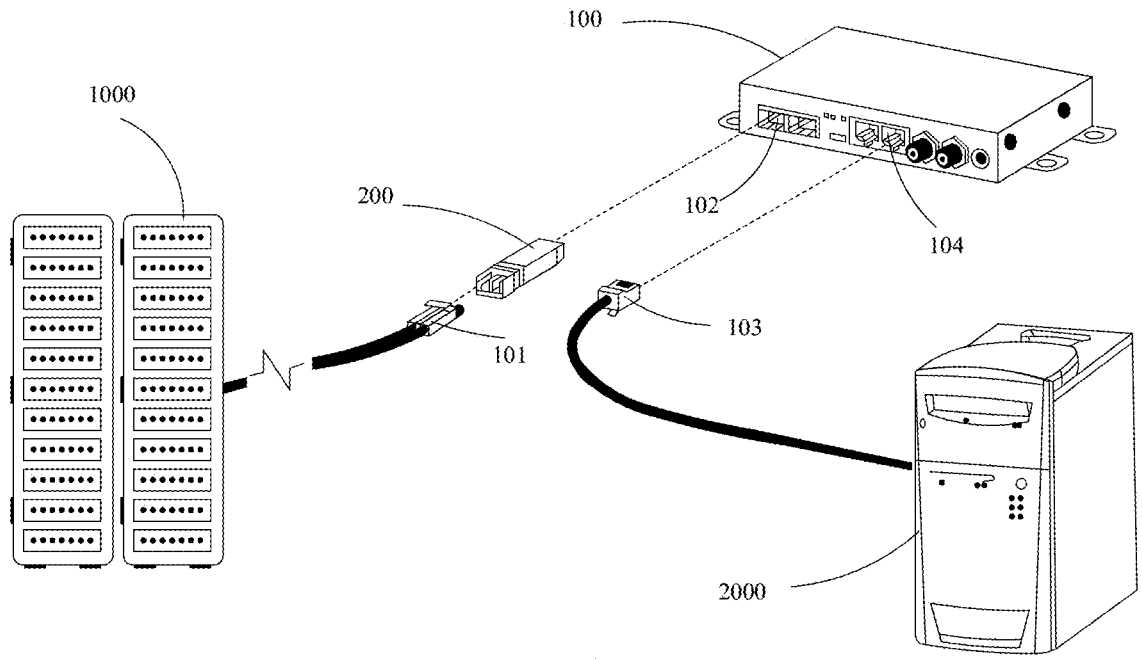
FIG. 1A is a connection relationship diagram of an optical communication system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, the term "a plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when" or "in a case where" or "in response to determining" or "in response to detecting". Similarly, the phrase "if it is determined" or "if [a stated condition or event] is detected", depending on the context, is optionally construed as "in a case where it is determined" or "in response to determining" or "in a case where [the stated condition or event] is detected" or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, the term "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In optical communication technology, an optical signal is used to carry information to be transmitted, and the optical signal carrying the information is transmitted to an information processing device such as a computer through an information transmission device such as an optical fiber or an optical waveguide, so as to achieve transmission of the information. Since the optical signal has a characteristic of passive transmission when being transmitted through the optical fiber or the optical waveguide, low-cost and low-loss information transmission may be achieved. In addition, a signal transmitted by the information transmission device such as the optical fiber or the optical waveguide is an optical signal, while a signal that can be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of interconversion between the optical signal and the electrical signal in the field of optical fiber communication technology. The optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an I2C signal, transmission of a data signal and grounding. The optical network terminal transmits the electrical signal to the information processing device such as the computer through a network cable or wireless fidelity (Wi-Fi).

Figure 1B:
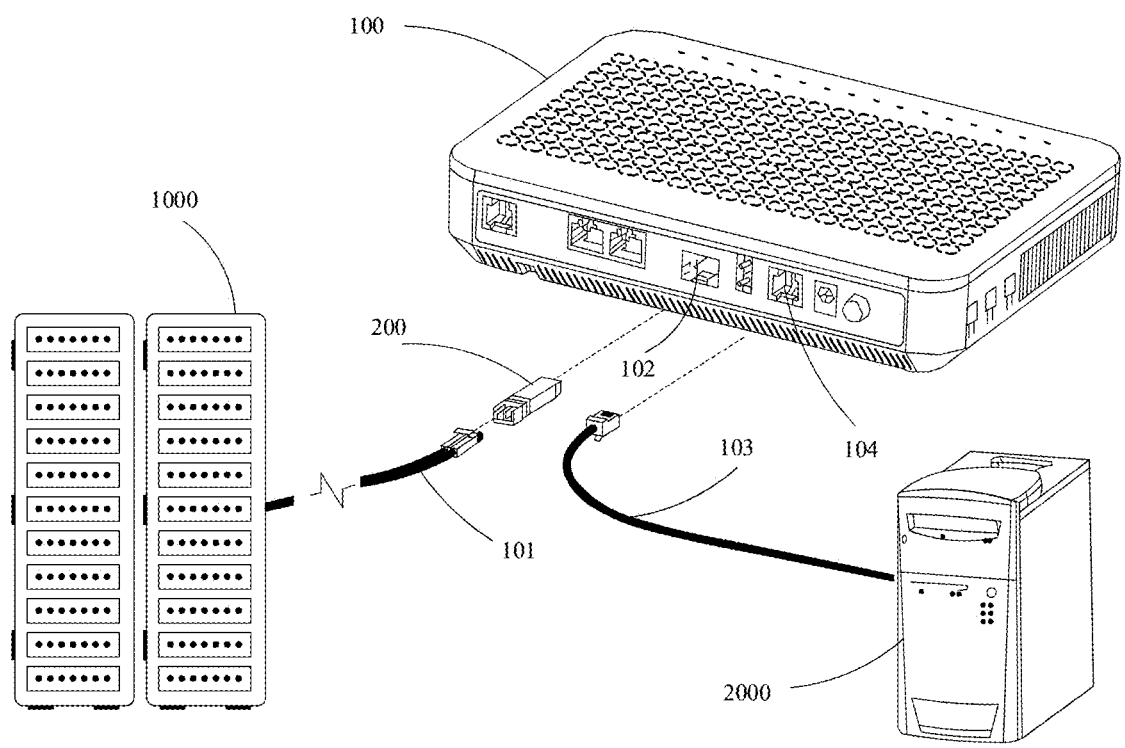
FIG. 1B is a connection relationship diagram of another optical communication system, in accordance with some embodiments.

FIG. 1A is a connection relationship diagram of an optical communication system, and FIG. 1B is a connection relationship diagram of another optical communication system. As shown in FIGS. 1A and 1B, the optical communication system includes a remote server 1000, a local information processing device 2000, an optical network terminal 100, an optical module 200, an optical fiber 101 and a network cable 103.

One terminal of the optical fiber 101 is connected to the remote server 1000, and the other terminal thereof is connected to the optical network terminal 100 through the optical module 200. The optical fiber itself may support long-distance signal transmission, such as several-kilometer (6-kilometer to 8-kilometer) signal transmission. On this basis, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

One terminal of the network cable 103 is connected to the local information processing device 2000, and the other terminal thereof is connected to the optical network terminal 100. The local information processing device 2000 is at least one of the followings: a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is completed by the optical fiber 101 and the network cable 103, and connection between the optical fiber 101 and the network cable 103 is completed by the optical module 200 and the optical network terminal 100.

The optical module 200 includes an optical port and an electrical port. The optical port is configured to access the optical fiber 101, so that the optical module 200 and the optical fiber 101 establish bidirectional optical signal connection; and the electrical port is configured to access the optical network terminal 100, so that the optical module 200 and the optical network terminal 100 establish bidirectional electrical signal connection. Interconversion between the optical signal and the electrical signal is achieved by the optical module 200, so that a connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that the bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 200 has been established through the optical fiber 101, the optical module 200, the optical network terminal 100 and the network cable 103.

Figure 2:
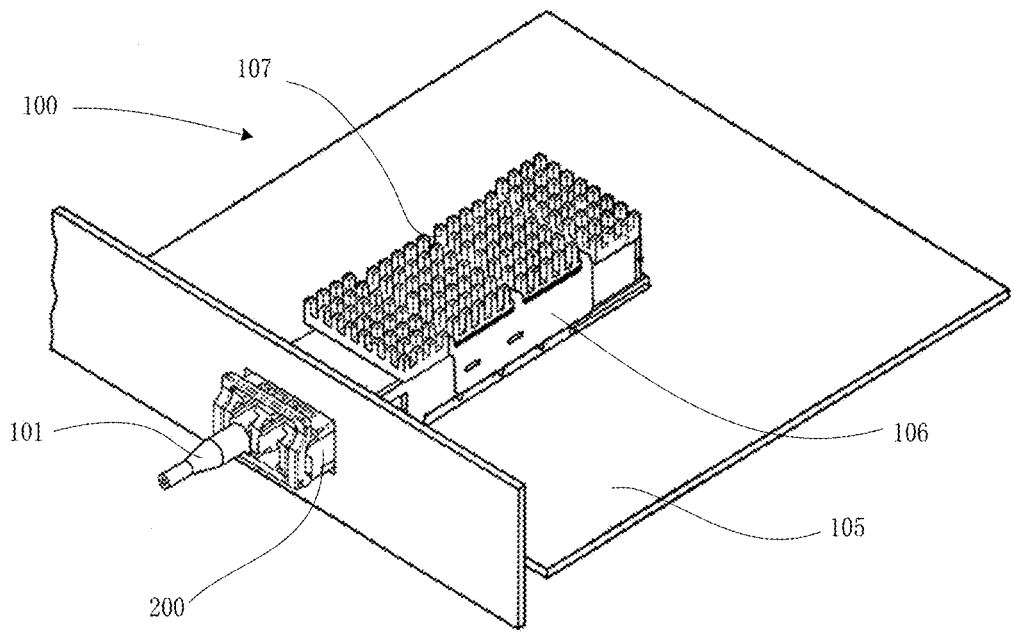
FIG. 2 is a structural diagram of an optical network terminal, in accordance with some embodiments.

FIG. 2 is a structural diagram of an optical network terminal. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200. The heat sink 107 has protruding portions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector in the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3:
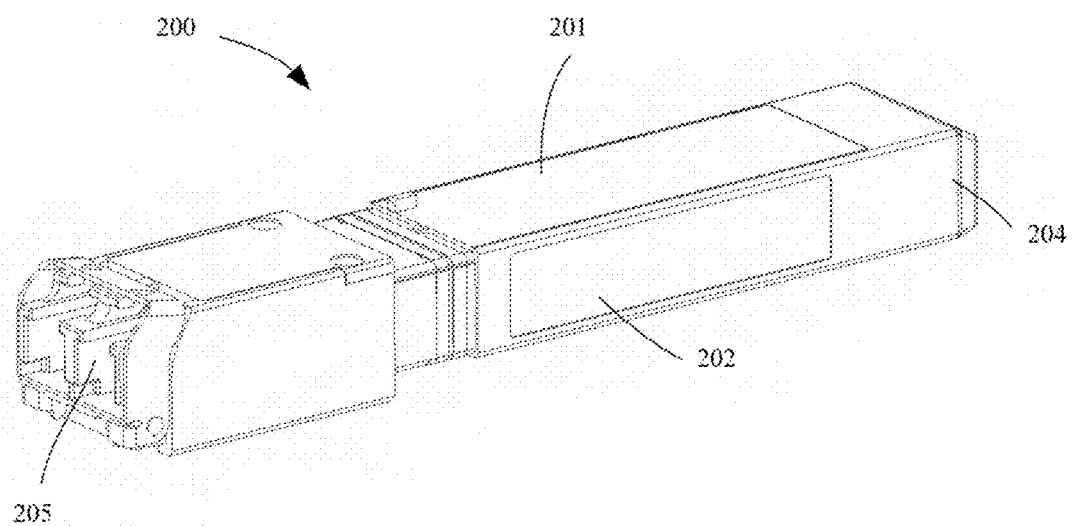
FIG. 3 is a structural diagram of an optical module, in accordance with some embodiments.
Figure 4A:
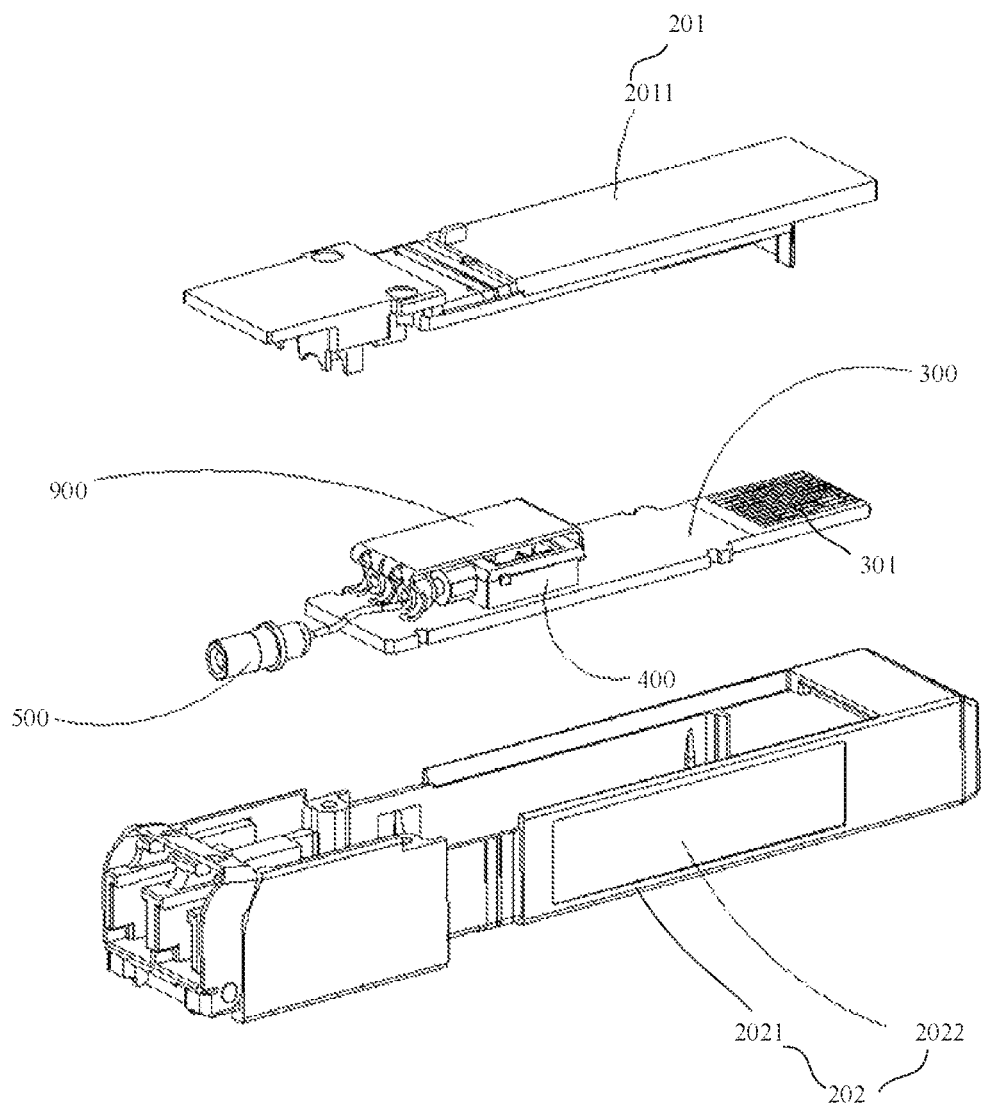
FIG. 4A is an exploded structural diagram of an optical module, in accordance with some embodiments.

FIG. 3 is a structural diagram of an optical module 200, in accordance with some embodiments, and FIG. 4A is an exploded structural diagram of an optical module 200, in accordance with some embodiments. As shown in FIGS. 3 and 4A, the optical module 200 includes a shell, and a circuit board 300, a lens assembly 400 and an optical fiber ferrule assembly 500 which are disposed in the shell.

The shell includes an upper shell 201 and a lower shell 202. The upper shell 201 covers the lower shell 202 to form the above shell with two openings, and an outer contour of the shell is generally in a cuboid shape.

In some embodiments, the lower shell 202 includes a bottom plate 2021 and two lower side plates 2022 located on two sides of the bottom plate 2021 and disposed perpendicular to the bottom plate 2021; and the upper shell 201 includes a cover plate 2011, and the cover plate 2011 covers the two lower side plates 2022 of the lower shell 202 to form the above shell.

In some embodiments, the lower shell 202 includes a bottom plate and two lower side plates located on both sides of the bottom plate respectively and disposed perpendicular to the bottom plate; the upper shell 201 includes a cover plate and two upper side plates located on both sides of the cover plate respectively and disposed perpendicular to the cover plate; and the two upper side plates are combined with the two lower side plates respectively, so that the upper shell 201 covers the lower shell 202.

A direction in which a connecting line between the two openings 204 and 205 is located may be the same as a longitudinal direction of the optical module 200, or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Or the opening 204 is located at an end of the optical module 200, and the opening 205 is located on a side of the optical module 200. The opening 204 is an electrical port, a connecting finger 301 of the circuit board 300 extends from the electrical port 204, and inserts into the master monitor (e.g., the optical network terminal 100); and the opening 205 is an optical port, which is configured to access an external optical fiber 101, so that the external optical fiber 101 is connected to the lens assembly 400 inside the optical module 200.

By using an assembly mode of combining the upper shell 201 with the lower shell 202, it is possible to facilitate installation of components such as the circuit board 300 and the lens assembly 400 into the shell, and the upper shell 201 and the lower shell 202 may form encapsulation and protection for the components. In addition, when components such as the circuit board 300 and the lens assembly 400 are assembled, it is possible to facilitate arrangement of positioning parts, heat dissipation parts and electromagnetic shielding parts of these components, which is conducive to implementation of automated production.

In some embodiments, the upper shell 201 and the lower shell 202 are generally made of a metal material, which facilitates electromagnetic shielding and heat dissipation.

The circuit board 300 is disposed in the shell of the optical module 200, including a circuit wiring, electronic elements, chips, etc. Through the circuit wiring, the electronic elements and the chips are connected together according to a circuit design, so as to implement functions such as power supply, transmission of electrical signals, and grounding. The electronic elements may include, for example, capacitors, resistors, triodes, and metal-oxide-semiconductor field-effect transistors (MOSFETs). The chips may include, for example, microcontroller units (MCUs), clock data recovery (CDR) chips, power management chips or digital signal processing (DSP) chips.

The circuit board 300 is generally a rigid circuit board, and the rigid circuit board may also implement a load-bearing function due to its relatively hard material. For example, the rigid circuit board may stably bear the electronic elements and the chips, and may also be inserted into the electrical connector in the cage of the master monitor.

The circuit board 300 further includes a connecting finger 301 formed on an end surface thereof, and the connecting finger 301 is composed of a plurality of independent pins. The circuit board 300 is inserted into the cage 106, and is conductively connected to the electrical connector in the cage 106 through the connecting finger 301. The connecting finger 301 may be disposed on only one surface (e.g., an upper surface shown in FIG. 4A) of the circuit board 300, or may be disposed on both upper and lower surfaces of the circuit board 300 to adapt to an occasion with a demand for a large number of pins. The connecting finger 301 is configured to establish electrical connection with the master monitor to achieve power supply, grounding, transmission of an I2C signal, and transmission of a data signal, etc.

Of course, flexible circuit boards are also used in some optical modules. A flexible circuit board is generally used in conjunction with the rigid circuit board.

Figure 5:
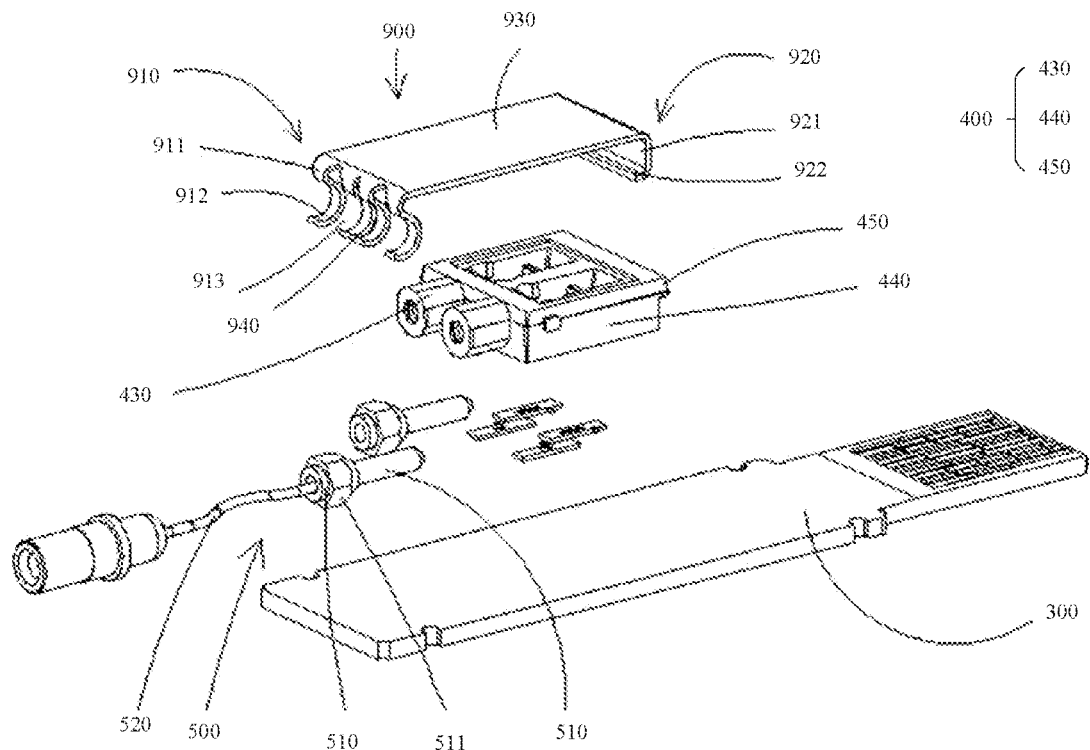
FIG. 5 is a diagram showing a disassembled structure of the lens assembly, the optical fiber ferrule assembly, the fastener and the circuit board in the optical module of FIG. 4A.
Figure 6:
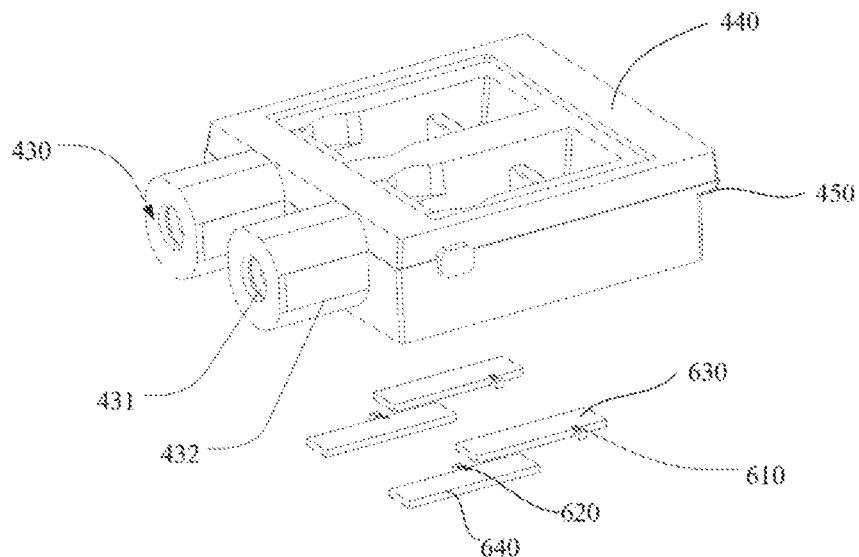
FIG. 6 is a diagram showing a disassembled structure of a lens assembly and chips, in accordance with some embodiments.

As shown in FIGS. 5 and 6, the optical module 200 further includes a light-emitting chip 610, a driving chip 630, a light-receiving chip 620 and a trans-impedance amplifier chip 640 that are disposed on the circuit board 300. The driving chip 630 is configured to cooperate with the light-emitting chip 610 to drive the light-emitting chip 610 to generate an optical signal; and the trans-impedance amplifier chip 640 is configured to cooperate with the light-receiving chip 620 assist the light-receiving chip 620 to receive an optical signal.

Of course, in some embodiments, the optical module 200 may include only the light-emitting chip 610 and the driving chip 630, or may include only the light-receiving chip 620 and the trans-impedance amplifier chip 640.

Figure 4B:
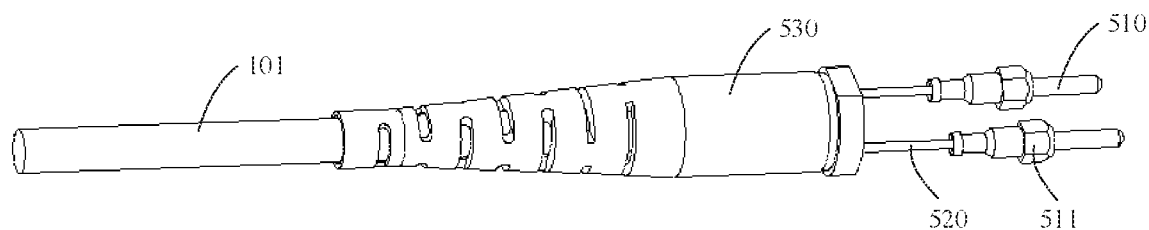
FIG. 4B is a diagram showing a connection structure between the optical fiber ferrule assembly in the optical module of FIG. 4A and an external optical fiber.

As shown in FIG. 4A, one end of the optical fiber ferrule assembly 500 is connected to the lens assembly 400, and as shown in FIG. 4B, the other end of the optical fiber ferrule assembly 500 is connected to the external optical fiber 101. The optical fiber ferrule assembly 500 is configured to transmit an optical signal. For example, an optical signal emitted from the light-emitting chip 610 enters the optical fiber ferrule assembly 500 after passing through the lens assembly 400, and is transmitted to the external optical fiber 101 through the optical fiber ferrule assembly 500, thereby outputting the optical signal to an outside of the optical module 200. An optical signal transmitted from the external optical fiber 101 is transmitted into the lens assembly 400 through the optical fiber ferrule assembly 500, and then enters the light-receiving chip 620, thereby receiving the optical signal from the outside of the optical module 200.

Figure 7:
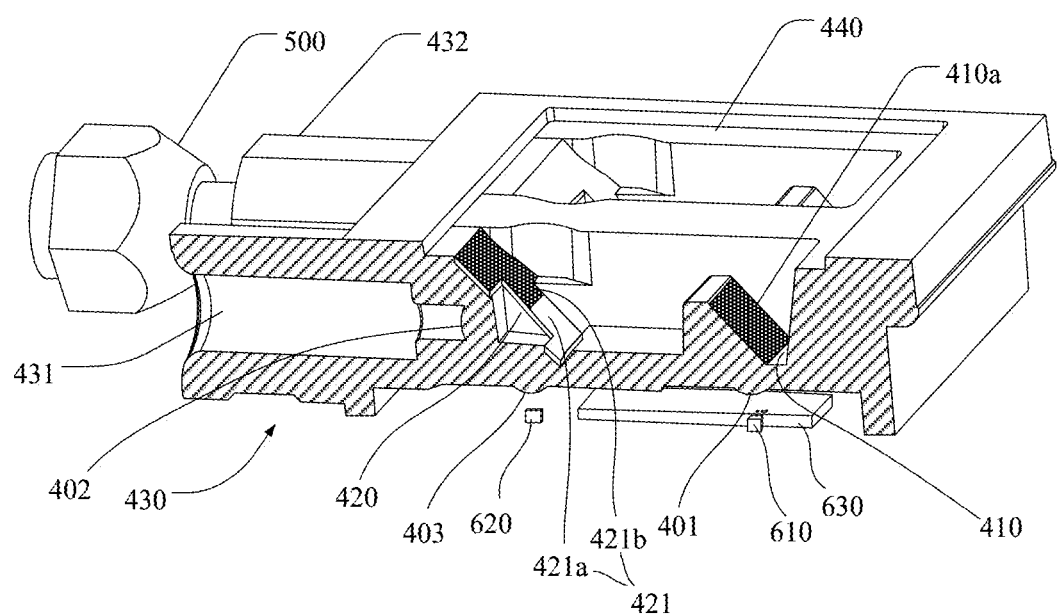
FIG. 7 is a cross-sectional view of a lens assembly and an optical fiber ferrule assembly, in accordance with some embodiments.

As shown in FIGS. 6 and 7, the lens assembly 400 is disposed on the circuit board 300, and is configured to change a propagation direction of the optical signal. The lens assembly 400 and the circuit board 300 form a receiving cavity in which the light-emitting chip 610, the driving chip 630, the light-receiving chip 620 and the trans-impedance amplifier chip 640 are disposed. The lens assembly 400 covers the light-emitting chip 610, the driving chip 630, the light-receiving chip 620 and the trans-impedance amplifier chip 640, so that the above chips are covered under the lens assembly 400.

The optical signal emitted from the light-emitting chip 610 enters the lens assembly 400, enters the optical fiber ferrule assembly 500 after being reflected by the lens assembly 400, and is transmitted to the external optical fiber 101 through the optical fiber ferrule assembly 500; and the optical signal from the external optical fiber 101 is transmitted into the lens assembly 400 through the optical fiber ferrule assembly 500, and enters the light-receiving chip 620 after being reflected by the lens assembly 400. That is, the lens assembly 400 not only serves to enclose the light-emitting chip 610, and the light-receiving chip 620, but also establishes optical connections between the light-emitting chip 610 and the optical fiber ferrule assembly 500 and between the light-receiving chip 620 and the optical fiber ferrule assembly 500.

As shown in FIG. 5, the lens assembly 400 includes a plugging portion 430 and a lens base 440.

The plugging portion is disposed at one end of the lens base 440, and is configured to allow the optical fiber ferrule assembly 500 to be inserted. The plugging portion 430 has a cavity therein for receiving the optical fiber ferrule assembly 500, and an opening for insertion of the optical fiber ferrule assembly 500 is provided at an end of the plugging portion 430. The optical fiber ferrule assembly 500 is inserted into the cavity of the plugging portion 430 through the opening, thereby realizing an optical connection between the optical fiber ferrule assembly 500 and the lens base 440, so that the optical signal transmitted from the optical fiber ferrule assembly 500 enters the lens base 440, or the optical signal emitted from the light-emitting chip 610 enters the optical fiber ferrule assembly 500 through the lens base 440.

As shown in FIG. 7, the plugging portion 430 includes an inner surface 431 and an outer surface 432. In order to facilitate insertion of the optical fiber ferrule assembly 500 into the plugging portion 430, a shape of an end of the optical fiber ferrule assembly 500 for being inserted into the plugging portion 430 is matched with a shape of the inner surface 431, and an inner diameter of the inner surface 431 is greater than an outer diameter of the end of the optical fiber ferrule assembly 500 for being inserted into the plugging portion 430. For example, a cross-sectional shape of the end of the optical fiber ferrule assembly 500 for being inserted into the plugging portion 430 is a circle, and a cross-sectional shape of the inner surface 431 is also a circle. Of course, the cross-sectional shape of the end of the optical fiber ferrule assembly 500 for being inserted into the plugging portion 430 and the cross-sectional shape of the inner surface 431 may also be an oval, a rectangle or a diamond, which are not limited in the present disclosure.

Figure 8:
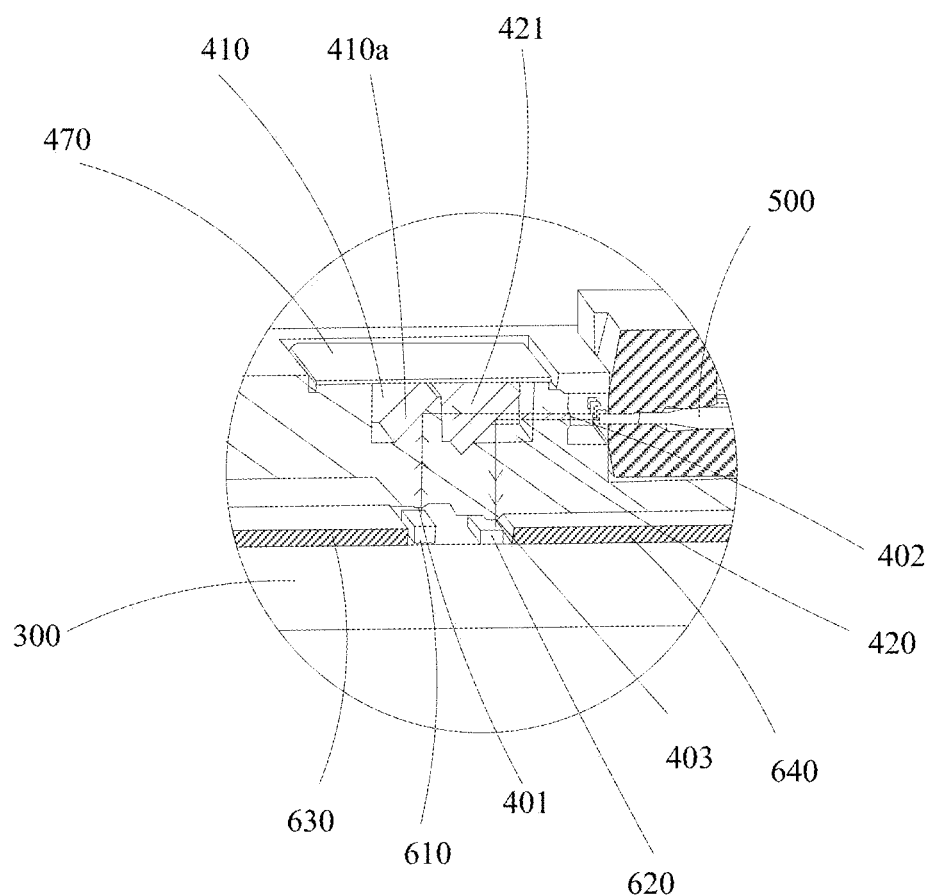
FIG. 8 is a diagram showing optical paths of chips, a lens assembly and an optical fiber ferrule assembly, in accordance with some embodiments.

As shown in FIGS. 7 and 8, the lens base 440 is configured to change a propagation direction of the optical signal, and includes a first groove 410, a second groove 420 and an optical filter 421. The first groove 410 is disposed on a surface of the lens base 440 away from the circuit board 300 and is recessed toward an inside of the lens base 440. An inclined sidewall of the first groove 410 forms a reflective surface 410a, and the optical signal emitted from the light-emitting chip 610 enters the lens base 440; after the optical signal is reflected by the reflective surface 410a, the propagation direction of the optical signal is changed (from a vertical direction to a horizontal direction), and the optical signal, the propagation direction of which is changed, is emitted into the optical fiber ferrule assembly 500.

The first groove 420 is disposed on a surface of the lens base 440 away from the circuit board 300 and is recessed toward the inside of the lens base 440. The second groove 420 is closer to the optical fiber ferrule assembly 500 than the first groove 410. The optical filter 421 is obliquely disposed in the second groove 420, and is configured to reflect the optical signal from the outside of the optical module 200 and transmit the optical signal emitted from the light-emitting chip 610. For example, the optical filter 421 has a transmissive portion 421a and a reflective portion 421b. The optical signal from the outside of the optical module 200 is transmitted into the lens base 440 through the optical fiber ferrule assembly 500; after the optical signal is reflected by the reflective portion 421b, the propagation direction of the optical signal is changed (from the horizontal direction to the vertical direction), and the optical signal, the propagation direction of which is changed, is emitted to the light-receiving chip 620. The optical signal emitted from the light-emitting chip 610 is emitted to the optical filter 421 after being reflected by the reflective surface 410a, and enters the optical fiber ferrule assembly 500 through the transmissive portion 421a. That is, in processes of transmitting an optical signal to the outside and receiving an optical signal from the outside, the optical signals share an optical path from the optical fiber ferrule assembly 500 to the optical filter 421.

In some embodiments, as shown in FIG. 8, the lens assembly 400 further includes a dust cap 470 covering the first groove 410 and the second groove 420.

In the above structure, the first groove 410 is provided on the surface of the lens base 440 away from the circuit board 300, so that the inclined sidewall thereof forms the reflective surface 410a, which is utilized to reflect the optical signal emitted from the light-emitting chip 610 into the optical fiber ferrule assembly 500. The manufacturing process of the above structure is simple. In addition, the second groove 420 is provided on the surface of the lens base 440 away from the circuit board 300, and a design of providing the optical filter 421 in the second groove 420 not only skillfully utilizes a light transmitting function of the optical filter 421 to make the optical signal reflected by the reflective surface 410a transmitted through the optical filter 421, but also skillfully utilizes a reflective function of the optical filter 421 to make the optical signal incident through the optical fiber ferrule assembly 500 to be reflected, and then received by the light-receiving chip 620. This type of optical path is ingenious in structural design, compact in structure, small in occupied space and low in cost.

In some embodiments, the optical module 200 includes only the light-emitting chip 610 and the driving chip 630, and the light-emitting chip 610 and the driving chip 630 are disposed in the receiving cavity formed by the lens assembly 400 and the circuit board 300. On this basis, the lens base 440 includes only the first groove 410 and does not include the second groove 420 and the optical filter 421. In some other embodiments, the optical module 200 includes only the light-receiving chip 620 and the trans-impedance amplifier chip 640, and the light-receiving chip 620 and the trans-impedance amplifier chip 640 are disposed in the receiving cavity formed by the lens assembly 400 and the circuit board 300. On this basis, the lens base 440 includes only the second groove 420 and the optical filter 421 disposed in the second groove 420, and does not include the first groove 410.

As shown in FIGS. 7 and 8, the lens base 440 further includes a first lens 401, a second lens 402 and a third lens 403. The first lens 401 is disposed on a surface of the lens base 440 proximate to the circuit board 300, and corresponds to a position of the light-emitting chip 610. The second lens 402 is disposed on a surface of the lens base 440 facing the optical fiber ferrule assembly 500, and corresponds to a position of the optical fiber ferrule assembly 500. The third lens 402 is disposed on the surface of the lens base 440 proximate to the circuit board 300, and is corresponding to a position of the light-receiving chip 620.

In a process where the optical module 200 transmits the optical signal to the outside, light carrying information emitted by the light-emitting chip 610 is emitted to the reflective surface 410a after being converted into parallel light through the first lens 401; and the parallel light is emitted to the second lens 402 through the transmissive portion 421a of the optical filter 421 after being reflected by the reflective surface 410a, and then enters the optical fiber ferrule assembly 500 after being converged by the second lens 402 (in this case, the second lens 402 is used as a focusing lens).

In a process where the optical module 200 receives the optical signal transmitted from the external optical fiber 101, the light carrying information is transmitted to the second lens 402 through the optical fiber ferrule assembly 500, and is emitted to the optical filter 421 after being converted into parallel light through the second lens 402 (in this case, the second lens 402 is used as a collimating lens); and the parallel light is emitted to the third lens 403 after being reflected by the reflective portion 421b of the optical filter 421, and then enters the light-receiving chip 620 after being converged by the third lens 403.

Figure 9:
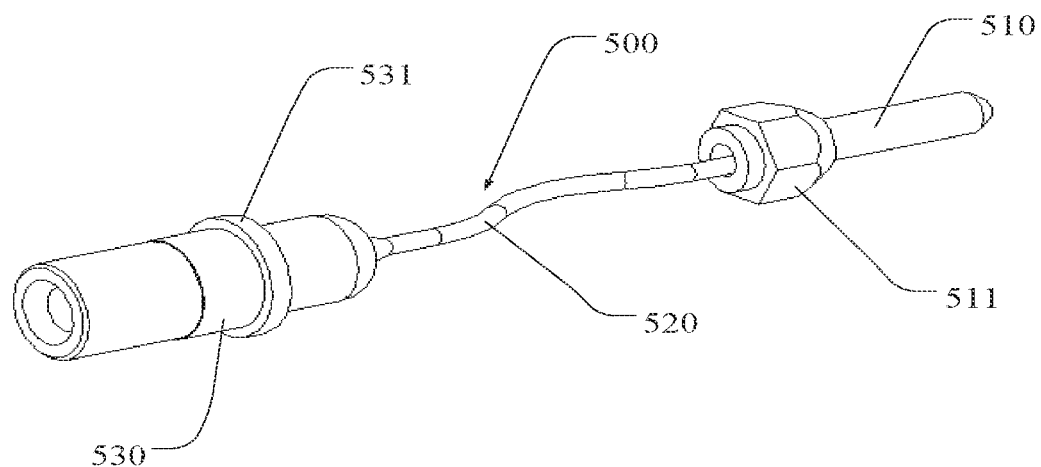
FIG. 9 is a structural diagram of an optical fiber ferrule assembly, in accordance with some embodiments.

As shown in FIG. 9, the optical fiber ferrule assembly 500 includes a first optical fiber ferrule 510, a second optical fiber ferrule, an internal optical fiber 520 and an optical fiber adapter 530. One end of the internal optical fiber 520 is connected to the first optical fiber ferrule 510, and the other end thereof is connected to the second optical fiber ferrule. The first optical fiber ferrule 510 is inserted into the plugging portion 430 of the lens assembly 400, thereby realizing an optical connection between the internal optical fiber 520 and the lens assembly 400. The second optical fiber ferrule is inserted into the optical fiber adapter 530, and a tail end of the external optical fiber 101 is also inserted into the optical fiber adapter 530, thereby realizing docking of the external optical fiber 101 and the internal optical fiber 520. The optical signal from the lens assembly 400 is transmitted into the external optical fiber 101 through the internal optical fiber 520, and the optical signal from the external optical fiber 101 is transmitted into the lens assembly 400 through the internal optical fiber 520.

The first optical fiber ferrule 510 has an optical fiber hole extending through opposite end faces of the first optical fiber ferrule 510. The internal optical fiber 520 passes through the optical fiber hole such that the internal optical fiber 520 is wrapped by the first optical fiber ferrule 510. In some embodiments, the first optical fiber ferrule 510 may be made of a ceramic material. In order to facilitate the internal optical fiber 520 passing through the first optical fiber ferrule 510, an inner diameter of the first optical fiber ferrule 510 (a diameter of the optical fiber hole) is greater than an outer diameter of the internal optical fiber 520.

It will be noted that the second optical fiber ferrule and the first optical fiber ferrule 510 have the same structure, which will not be described herein again.

The optical fiber ferrule assembly 500 further includes a sleeve base 511, and the sleeve base 511 has a through hole extending through opposite end faces of the sleeve base 511. The first optical fiber ferrule 510 passes through the through hole, so that the sleeve base 511 is sleeved on an outer circumference of the first optical fiber ferrule 510. An inner diameter of the sleeve base 511 (a diameter of the through hole) is greater than an outer diameter of the first optical fiber ferrule 510, which facilitates the first optical fiber ferrule 510 passing through the sleeve base 511. And there is a gap between the sleeve base 511 and the first optical fiber ferrule 510, which is convenient for glue dispensing operation, so that the sleeve base 511 and the first optical fiber ferrule 510 are adhered by glue.

The sleeve base 511 is made of, for example, stainless steel or other alloy materials, and the present disclosure is not limited thereto. An outer periphery of the sleeve base 511 may be in a shape of a hex nut, may also be in any other shape, and the present disclosure is not limited thereto. A surface of the sleeve base 511 is coated with glue. After aligning the first optical fiber ferrule 510 with the lens assembly 400, the sleeve base 511 is adhered to the circuit board 300 by glue.

If the second optical fiber ferrule is inserted into the optical fiber adapter 530, and the optical fiber adapter 530 wraps the second optical fiber ferrule, the optical fiber adapter 530 needs to be set as a hollow structure. A shape of the optical fiber adapter 530 may be a hollow cylinder, a hollow cuboid or a hollow cube, which is not limited in the present disclosure. An inner diameter of the optical fiber adapter 530 is greater than an outer diameter of the second optical fiber ferrule, thereby facilitating insertion of the second optical fiber ferrule into the optical fiber adapter 530.

The optical fiber ferrule assembly 500 further includes a clamping portion 531 disposed outside the optical fiber adapter 530, and the clamping portion 531 is configured to be clamped with the lower shell 202 of the optical module 200, thereby fixing the optical fiber adapter 530 to the lower shell 202. The clamping portion 531 may wrap around an outer circumference of the optical fiber adapter 530, or may wrap around only a part of the outer circumference of the optical fiber adapter 530. When the clamping portion 531 wraps around the outer circumference of the optical fiber adapter 530, a shape of the clamping portion 531 may be set as a circle.

In some embodiments of the present disclosure, the lens assembly 400 is connected to the optical fiber adapter 530 through the first optical fiber ferrule 510, the second optical fiber ferrule and the internal optical fiber 520, so that a problem that the lens assembly 400 cannot be communicatively connected to the external optical fiber 101 when a size of the lens assembly 400 is not consistent with a size of the optical port 205 may be solved. In addition, when the external optical fiber 101 is inserted into the optical fiber adapter 530, the lens assembly 400 is not caused to be shaken, and thus there is no problem that the lens assembly 400 cannot be communicatively connected to the external optical fiber 101 due to the shaking of the lens assembly 400.

As shown in FIGS. 10 and 16A to 16C, in order to prevent the optical fiber ferrule assembly 500 from slipping off the lens assembly 400, the optical module 200 further includes a fastener 900, and the fastener 900 is configured to clamp and fix the optical fiber ferrule assembly 500 into the lens assembly 400. The fastener 900 includes a fastening body 930, a first clamping portion 910 and a second clamping portion 920. The first clamping portion 910 is disposed at one end of the fastening body 930, and is clamped on the optical fiber ferrule assembly 500. The second clamping portion 920 is disposed at the other end of the fastening body 930, and is clamped on the lens assembly 400. The optical fiber ferrule assembly 500 is fixedly connected to the lens assembly 400 by the fastener 900.

The above structure realizes fixation between the optical fiber ferrule assembly 500 and the lens assembly 400 well. Compared with a manner in which the optical fiber ferrule assembly 500 is fixed on the circuit board 300 by glue dispensing after being inserted into the lens assembly 400, the above structure avoids inconvenience of glue dispensing operation, simplifies the assembly process, avoids glue scraping operation during disassembly, and also avoids a possibility of damaging the circuit board 300 and the lens assembly 400. In summary, a structural design of the optical module 200 enables the optical fiber ferrule assembly 500 and the lens assembly 400 to be fixedly connected without glue dispensing, and is simple in fixing structure, easy to operate, and low in assembly and maintenance cost.

It will be noted that a specific structure of the fastener 900 is not limited in the present disclosure, which may be a plate member, a clamping member, or any other shape.

In some embodiments, as shown in FIGS. 10 to 13, the first clamping portion 910 is clamped on the outer circumference of the first optical fiber ferrule 510, is located on a side of the sleeve base 511 away from the lens assembly 400, and abuts against the sleeve base 511. The lens assembly 400 further includes a clamping boss 450 disposed on a surface of the lens base 440 away from the optical fiber ferrule assembly 500. The second clamping portion 920 is clamped on the clamping boss 450.

Figure 14:
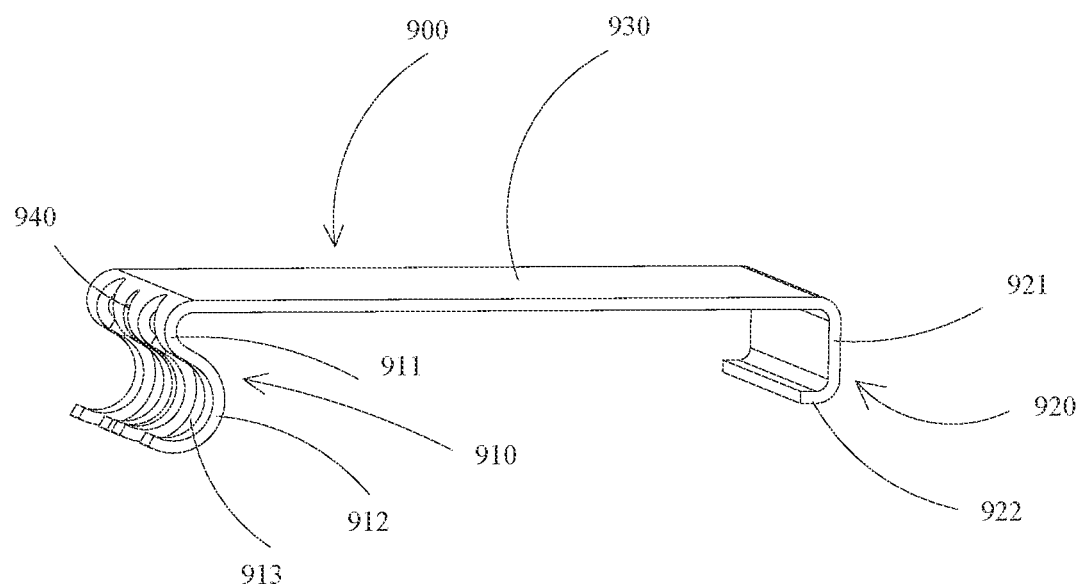
FIG. 14 is a structural diagram of a fastener, in accordance with some embodiments.

On this basis, as shown in FIG. 14, the first clamping portion 910 includes a first bending segment 911, a second bending segment 912 and a through hole 913. The first bending segment 911 is formed by being bent both downwards from one end of the fastening body 930 and in a direction away from the second clamping portion 920 (towards a left side in FIG. 14). The first bending segment 911 may be integrally formed with the fastening body 930, or the first bending segment 911 may be provided independently of the fastening body 930 and is connected to the fastening body 930 through welding or other connection modes, and the present disclosure is not limited thereto.

This type of structure may reduce stress between the second bending segment 912 and the fastening body 930, prevent the second bending segment 912 from breaking, and enable the second bending segment 912 to abut against the sleeve base 511 of the optical fiber ferrule assembly 500 with a relatively large elastic force. In addition, due to a fact that the elastic force is large, the first clamping portion 910 and the first optical fiber ferrule 510 may be separated conveniently when being disassembled.

The second bending segment 912 is formed by being bent both downwards from a tail end of the first bending segment 911 and in a direction proximate to the second clamping portion 920 (towards a right side in FIG. 14), and the second bending segment 912 abuts against the sleeve base 511. A tail end of the second bending segment 912 is bent upwards to form a large radian, so that a radian of the second bending segment 912 is greater than a radian of the first bending segment 911.

This type of structure enables the second bending segment 912 to abut against the optical fiber ferrule assembly 500 with a relatively large elastic force, and also enables a large holding position and space during assembly and disassembly for an operator, thereby facilitating assembly and disassembly.

In the above structure, it will be noted that an overall shape of the first clamping portion 910 is substantially an S shape. An upper arc segment of the S shape is small and a lower arc segment of the S shape is large, that is, an inner diameter of the upper arc segment is less than an inner diameter of the lower arc segment. An arc length of the upper arc segment is less than an arc length of the lower arc segment. The upper arc segment and the lower arc segment may be circular arcs or elliptical arcs, which is not limited in the present disclosure.

The first clamping portion 910 of the fastener 900 needs to be bent into an S shape, and thus the fastener 900 needs to be made of a material with good elasticity and flexibility. The fastener 900 may be a stainless steel sheet, and for example, SUS301 stainless steel may be selected. And a machining process may employ sheet metal stamping, so that the manufacture of the S shape may be realized very conveniently.

In the above structure, when the clamping is performed, the S-shaped first clamping portion 910 is deformed in the direction away from the second clamping portion 920 by manual force, thereby increasing a distance between the first clamping portion 910 and the second clamping portion 920, and an inner surface of the first clamping portion 910 is clamped on the optical fiber ferrule assembly 500. The second bending segment 912 abuts against the sleeve base 511 due to an action of an elastic contraction force of the fastener 900 itself; therefore, the optical fiber ferrule assembly 500 is clamped tightly on the lens assembly 400.

Figure 10:
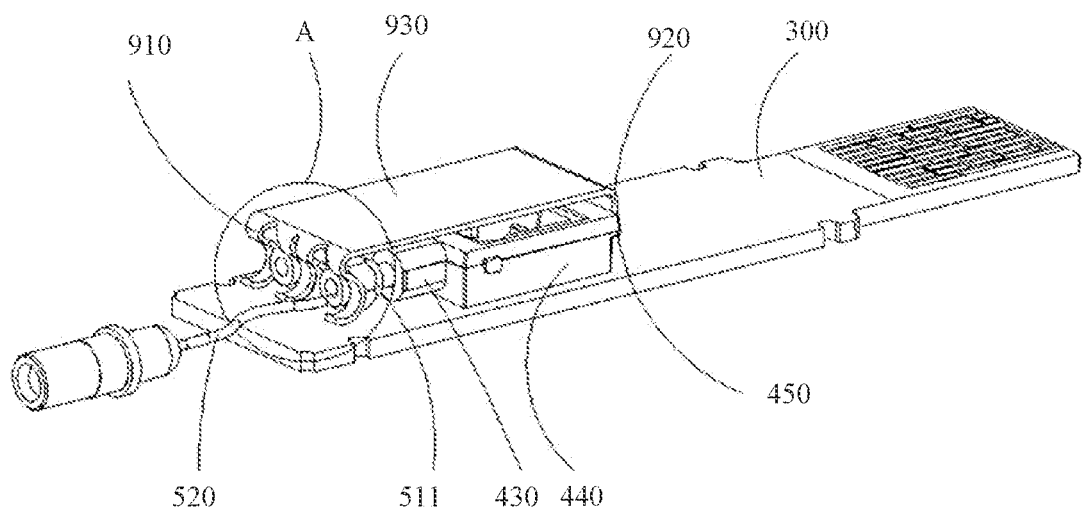
FIG. 10 is a diagram showing an assembled structure of the lens assembly, the optical fiber ferrule assembly, the fastener and the circuit board in the optical module of FIG. 4A.
Figure 11:
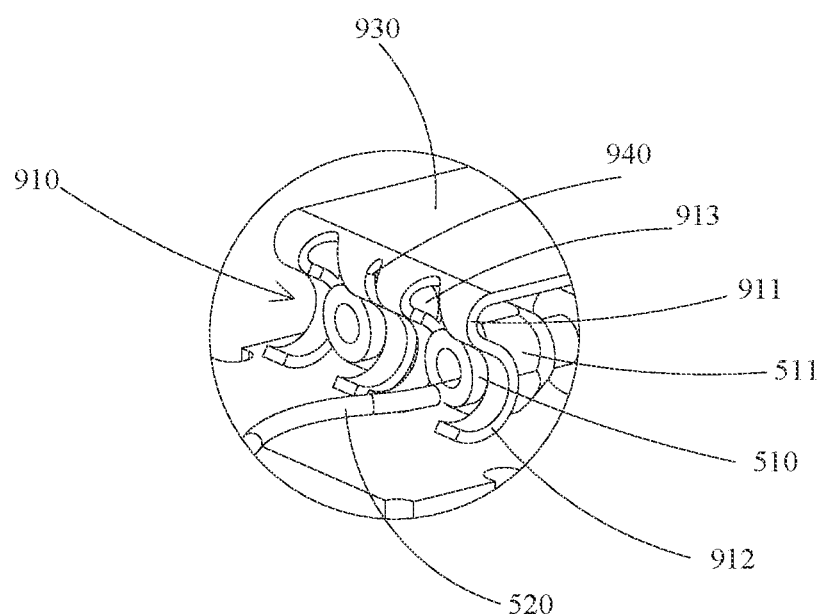
FIG. 11 is an enlarged view of portion A in FIG. 10.
Figure 12:
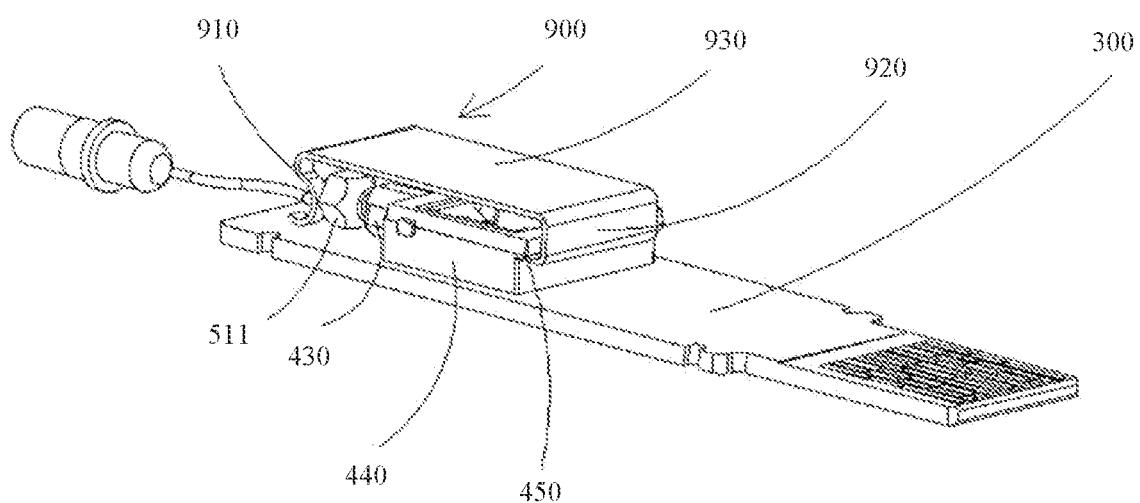
FIG. 12 is a structural diagram of the component structure in FIG. 10 from another perspective.
Figure 13:
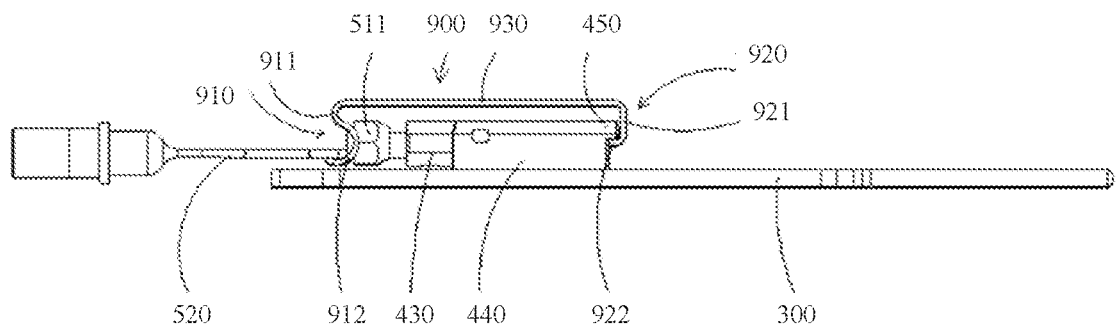
FIG. 13 is a front view of the component structure in FIG. 10.

Referring to FIGS. 10 and 11, the through hole 913 is provided in the first bending segment 911 and/or the second bending segment 912 to facilitate the internal optical fiber 520 to pass. For example, the through hole 913 may be a non-fully enclosed hole extending through the first bending segment 911 to the second bending segment 912; therefore, when the first clamping portion 910 is clamped with the optical fiber ferrule assembly 500, the clamping may be smoothly performed through the non-fully enclosed through hole 913. For example, the first clamping portion 910 is clamped on a circumferential outer wall of the first optical fiber ferrule 510 through the through hole 913. A function of the through hole 913 is not only to facilitate the internal optical fiber 520 to pass through, but also to reduce the elastic resistance of the first clamping portion 910, thereby facilitating the clamping between the first clamping portion 910 and the optical fiber ferrule assembly 500.

It will be noted that no other device exists or other devices may be included between the through hole 913 and the internal optical fiber 520. For example, the internal optical fiber 520 is wrapped by the first optical fiber ferrule 510, and the first optical fiber ferrule 510 passes through the through hole 913 with wrapping the internal optical fiber 520; alternatively, the first optical fiber ferrule 510 is wrapped by the sleeve base 511, and the sleeve base 511 passes through the through hole 913 with wrapping the first optical fiber ferrule 510 which further wraps the internal optical fiber 520.

A structure of the optical fiber ferrule assembly 500 is not limited in the present disclosure. Therefore, any structure of the optical fiber ferrule assembly 500 should be within the protection scope of the present disclosure, as long as the structure of the optical fiber ferrule assembly 500 facilitates the clamping of the optical fiber ferrule assembly 500 and the lens assembly due to the clamping action of the fastener 900.

Figure 15:
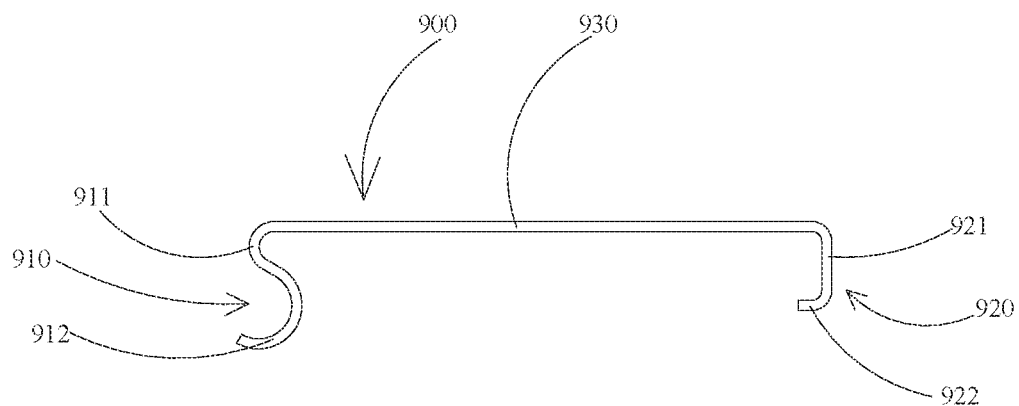
FIG. 15 is a front view of the fastener in FIG. 14.

Referring to FIGS. 14 and 15, the second clamping portion 920 includes a third bending segment 921 and a fourth bending segment 922.

The third bending segment 921 is formed by being bent downwards from the other end of the fastening body 930; and the fourth bending segment 922 is formed by being bent from a tail end of the third bending segment 921 towards the first clamping portion 910. The fourth bending segment 922 is clamped with the clamping boss 450, so that the fourth bending segment 922 is closer to the circuit board 300 than the clamping boss 450.

In the above structure, an overall shape of the second clamping portion 920 is substantially a C-shape opening toward the first clamping portion 910, and is, of course, an irregular C-shape structure.

In the above structure, due to the existence of the clamping boss 450 of the lens assembly 400, the fastener 900 is limited in the vertical direction. In addition, since a distance from a rear end face of the lens assembly 400 (a right end face of the lens assembly 400 shown in FIG. 13) to a front end face of the sleeve base 511 of the optical fiber ferrule assembly 500 (a left end face of the optical fiber ferrule assembly 500 shown in FIG. 13) is greater than a distance from a surface of the first clamping portion 910 abutted against the sleeve base 511 to an end face of the fourth bending segment 922 of the second clamping portion 920, the fastener 900 is able to tightly clamp the optical fiber ferrule assembly 500 and the lens assembly 400 together.

It will be noted that a structure of the second clamping portion 920 is not limited in the present disclosure, as long as the second clamping portion 920 can be clamped on the lens assembly 400; for example, the second clamping portion 920 and the lens assembly 400 may employ a convex-concave matching structure, a clamping matching structure or other matching structures.

In some embodiments of the present disclosure, for example, referring to FIG. 10, there are two optical fiber ferrule assemblies 500. It will be noted that each of the two optical fiber ferrule assemblies 500 may transmit an optical signal either outwards or inwards. Alternatively, one of the two optical fiber ferrule assemblies 500 transmits an optical signal outwards and the other of the two optical fiber ferrule assemblies 500 transmits an optical signal inwards.

On this basis, as shown in FIG. 5, there are two lens assemblies 400 and two fasteners 900; and each optical fiber ferrule assembly 500 is connected to a corresponding lens assembly 400, and is tightly fixed to the corresponding lens assembly 400 through a fastener 900. In this case, the two lens assemblies 400 may be separate or integral, and the two fasteners 900 may also be separate or integral.

When the two fasteners 900 form an integral structure, the fastener 900 includes an isolation hole 940 provided between the two first clamping portions 910. The two first clamping portions 910 are each clamped on one optical fiber ferrule assembly 500. In a case where sizes of the two optical fiber ferrule assemblies 500 are different, the isolation holes 940 are provided so that each first clamping portion 910 is tightly clamped on one optical fiber ferrule assembly 500 without affecting each other. In addition, a design of providing the isolation hole 940 facilitates an increase of the elastic force, and facilitates assembly and disassembly of the fastener 900.

Figure 16A:
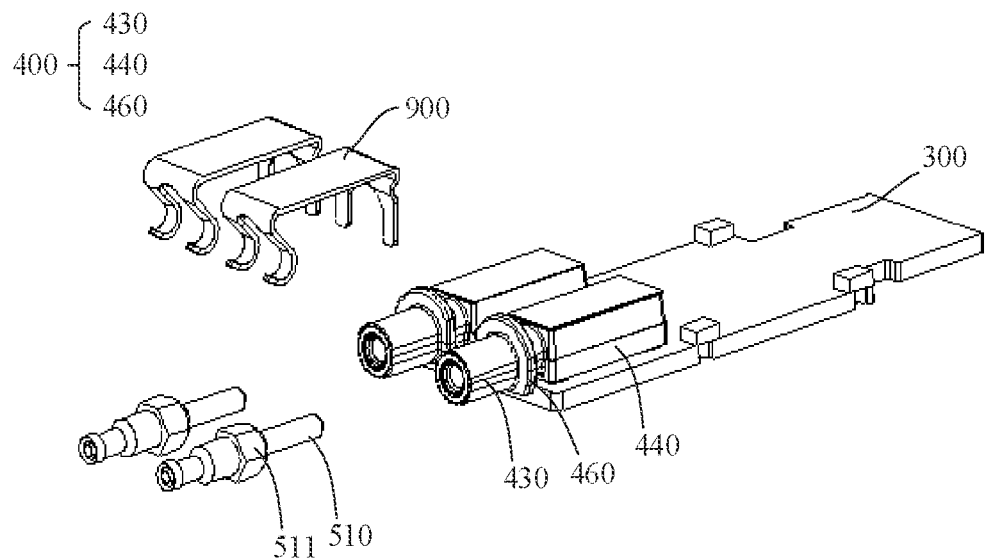
FIG. 16A is a diagram showing another disassembled structure of a lens assembly, an optical fiber ferrule assembly and a fastener, in accordance with some embodiments.
Figure 16B:
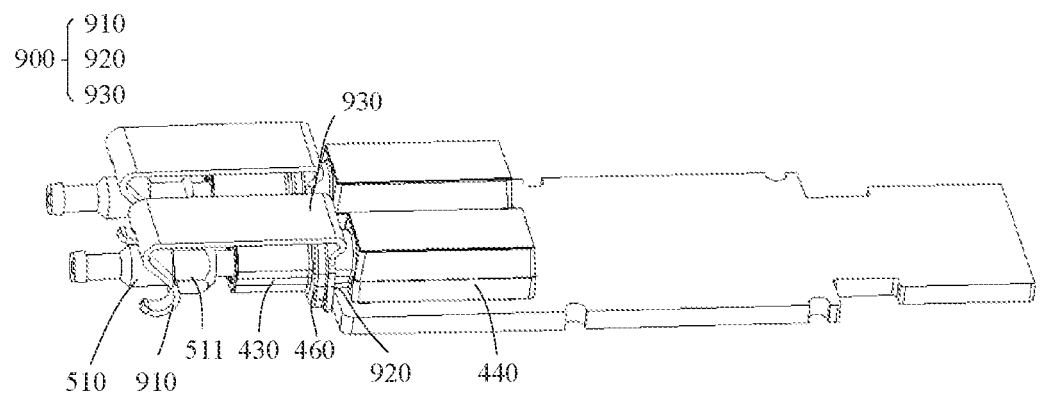
FIG. 16B is a diagram showing an assembled structure of the components in FIG. 16A.
Figure 16C:
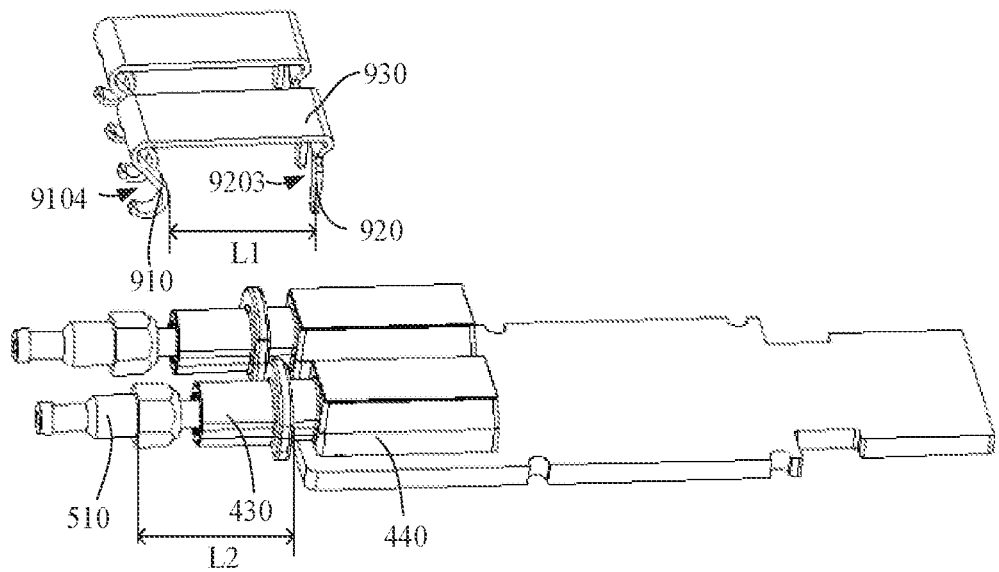
FIG. 16C is a diagram showing an assembled structure of the lens assembly and the optical fiber ferrule assembly in FIG. 16A.

In some embodiments, the structure of the fastener 900 is not limited to the structure shown in FIGS. 5 and 10. As shown in FIGS. 16A to 16C, the first clamping portion 910 is clamped on the outer circumference of the first optical fiber ferrule 510, is located on a side of the sleeve base 511 away from the lens assembly 400, and abuts against the sleeve base 511. The lens assembly 400 further includes a positioning portion 460 on an outer circumference of the plugging portion 430. The second clamping portion 920 is clamped on the outer circumference of the plugging portion 430, is located on a side of the positioning portion 460 away from the optical fiber ferrule assembly 500, and abuts against the positioning portion 460.

A distance L1 between the first clamping portion 910 and the second clamping portion 920, which are not deformed before being installed with the optical fiber ferrule assembly 500 and the lens assembly 400, is less than a distance L2 between the sleeve base 511 of the first optical fiber ferrule 510 and the positioning portion 460 of the plugging portion 430. It will be noted that, in some embodiments of the present disclosure, the distance L1 between the first clamping portion 910 and the second clamping portion 920 refers to a distance between a surface of the first clamping portion 910 in contact with the sleeve base 511 and a surface of the second clamping portion 920 in contact with the positioning portion 460; the distance L2 between the sleeve base 511 and the positioning portion 460 refers to a distance between a surface of the sleeve base 511 in contact with the first clamping portion 910 and a surface of the positioning portion 460 in contact with the second clamping portion 920.

Thus, after the fastener 900 is assembled on the plugging portion 430 and the first optical fiber ferrule 510, the first clamping portion 910 abuts against the sleeve base 511, and the second clamping portion 920 abuts against the positioning portion 460; and then the first clamping portion 910 is utilized to apply a force towards the plugging portion 430 to the first optical fiber ferrule 510, and the second clamping portion 920 is utilized to apply a force towards the first optical fiber ferrule 510 to the plugging portion 430, which further makes the first optical fiber ferrule 510 and the plugging portion 430 fixed together.

Figure 17:
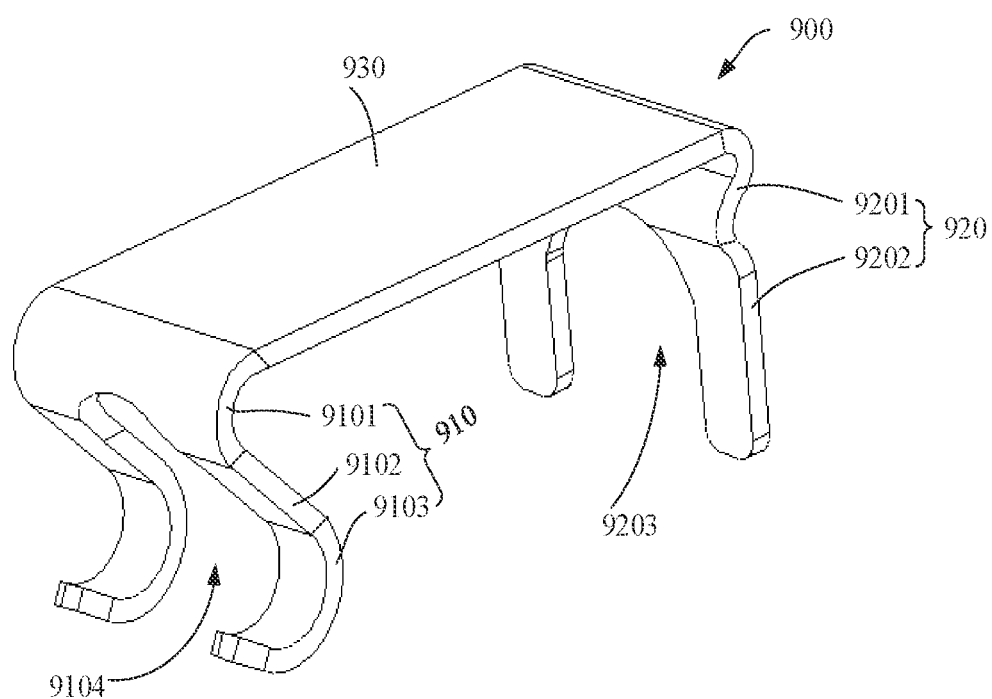
FIG. 17 is another structural diagram of a fastener, in accordance with some embodiments.
Figure 18:
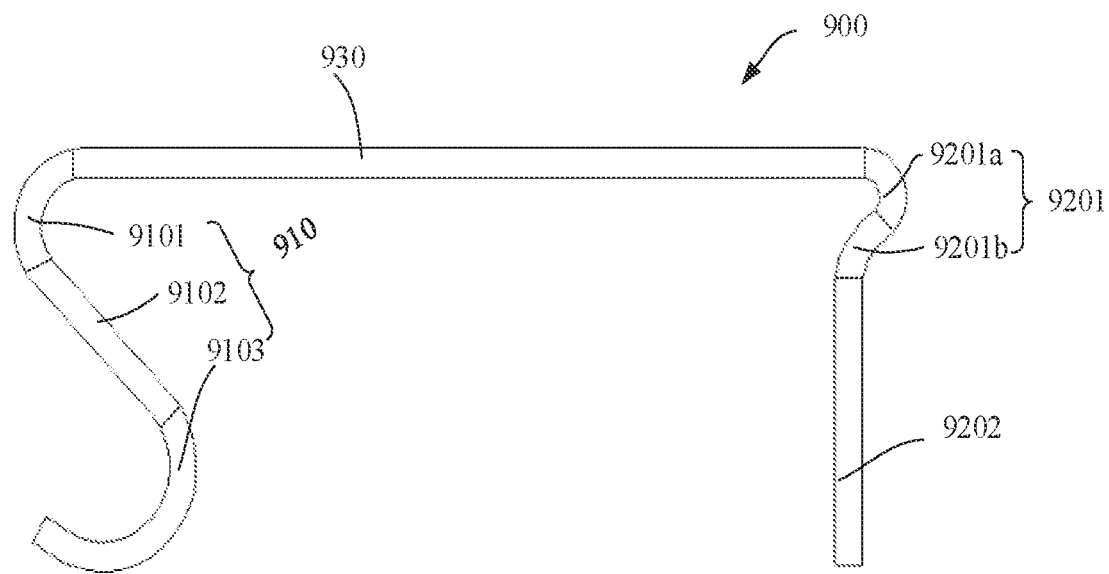
FIG. 18 is a front view of the fastener in FIG. 17.

In some embodiments of the present disclosure, in order to achieve a better fastening action of the fastener 900, as shown in FIGS. 17 to 18, the first clamping portion 910 includes a first bending segment 9101, a connecting segment 9102, a second bending segment 9103 and a through hole 9104; and the second clamping portion 920 includes a third bending segment 9201 and a fourth socket 9202.

As shown in FIGS. 17 and 18, the first bending segment 9101 is designed as a curved structure, a first end of the first bending segment 9101 is connected to a first end of the fastening body 930, and a second end of the first bending segment 9101 is connected to a first end of the connecting segment 9102; the connecting segment 9102 has a flat plate structure, a second end of the connecting segment is connected to a first end of the second bending segment 9103; and the second bending segment 9103 also has a curved structure and is configured to abut against the sleeve base 511. In some embodiments of the present disclosure, the connecting segment 9102 is connected to the fastening body 930 by the first bending segment 9101 in a curved structure, which may reduce stress between the connecting segment 9102 and the fastening body 930, and prevent the connecting segment 9102 from breaking. In addition, by designing a radian of the first bending segment 9101, an included angle between the connecting segment 9102 and the fastening body 930 is made to be less than 90°, so that an extrusion force may be provided to the sleeve base 511 by the first clamping portion 910. Moreover, in order to prevent the fastener 900 from slipping off the first optical fiber ferrule 510, in some embodiments of the present disclosure, the included angle between the connecting segment 9102 and the fastening body 930 is designed to be greater than 30° and less than 60°, e.g., 45°. In this way, the fastener 900 may also apply a certain downward pressure to the first optical fiber ferrule 510, and thus no additional structure is needed to fix the first optical fiber ferrule 510.

Based on the above angle design between the connecting segment 9102 and the fastening body 930, in order to provide a sufficient contact area between the first clamping portion 910 and the sleeve base 511 of the first optical fiber ferrule 510, and to enhance a force of clamping the first optical fiber ferrule 510, the second bending segment 9103 is also designed as a curved structure, and an arc opening thereof faces away from the sleeve base 511.

Figure 20:
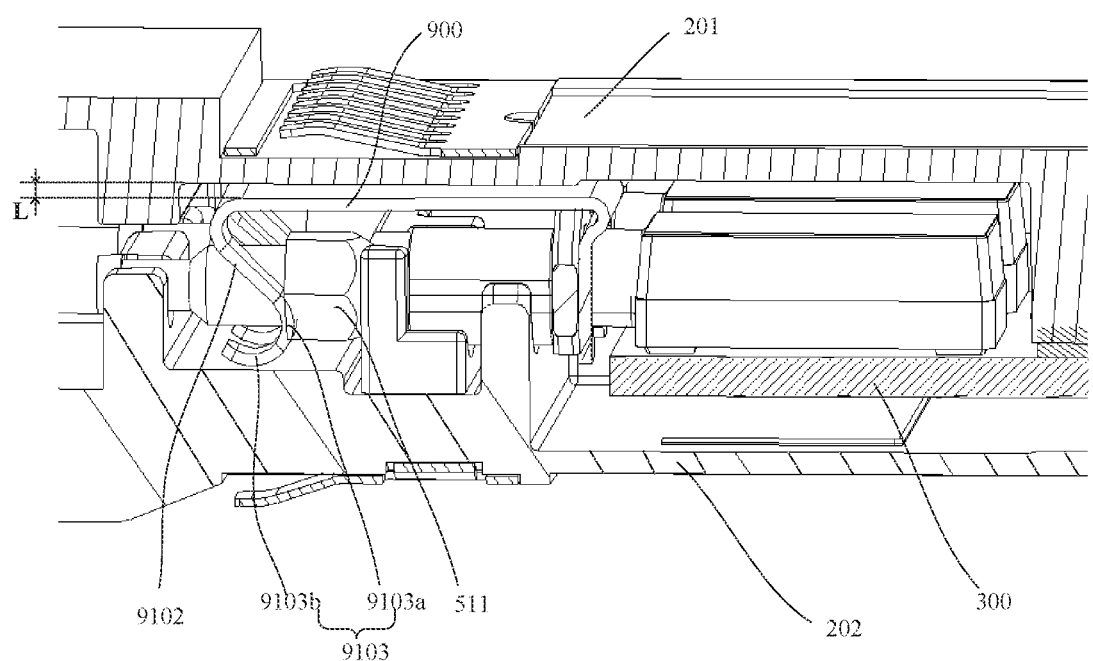
FIG. 20 is a sectional view of an optical module, in accordance with some embodiments.
Figure 21:
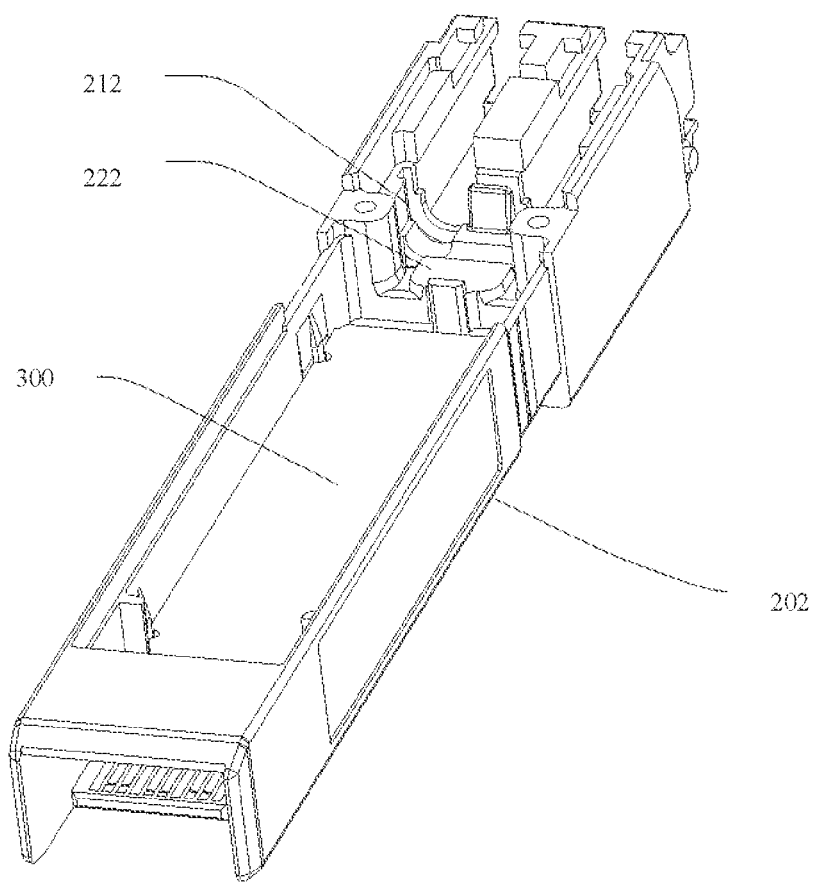
FIG. 21 is a structural diagram of a lower shell, in accordance with some embodiments.
Figure 22:
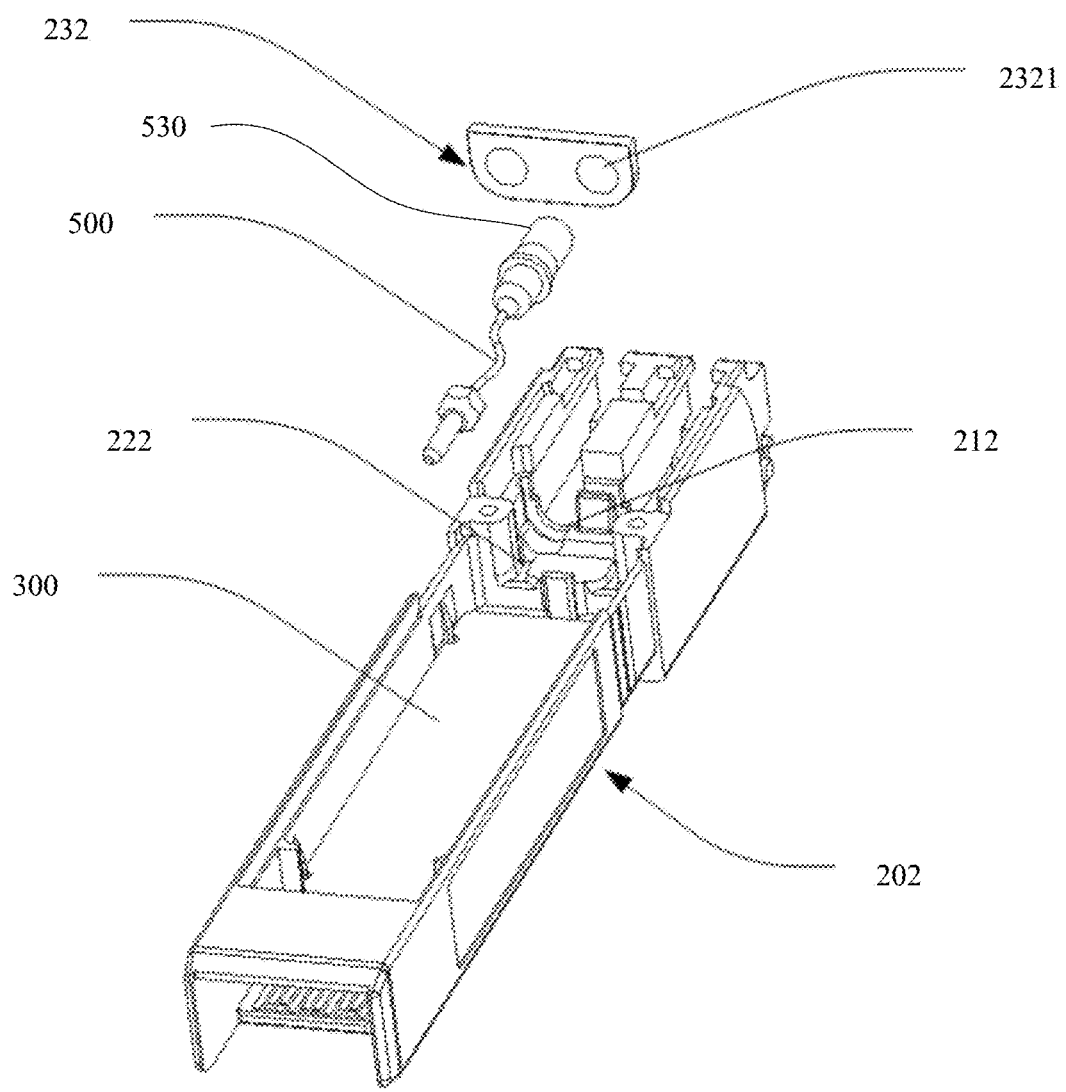
FIG. 22 is a diagram showing a disassembled structure of a lower shell and an optical fiber ferrule assembly, in accordance with some embodiments.
Figure 23:
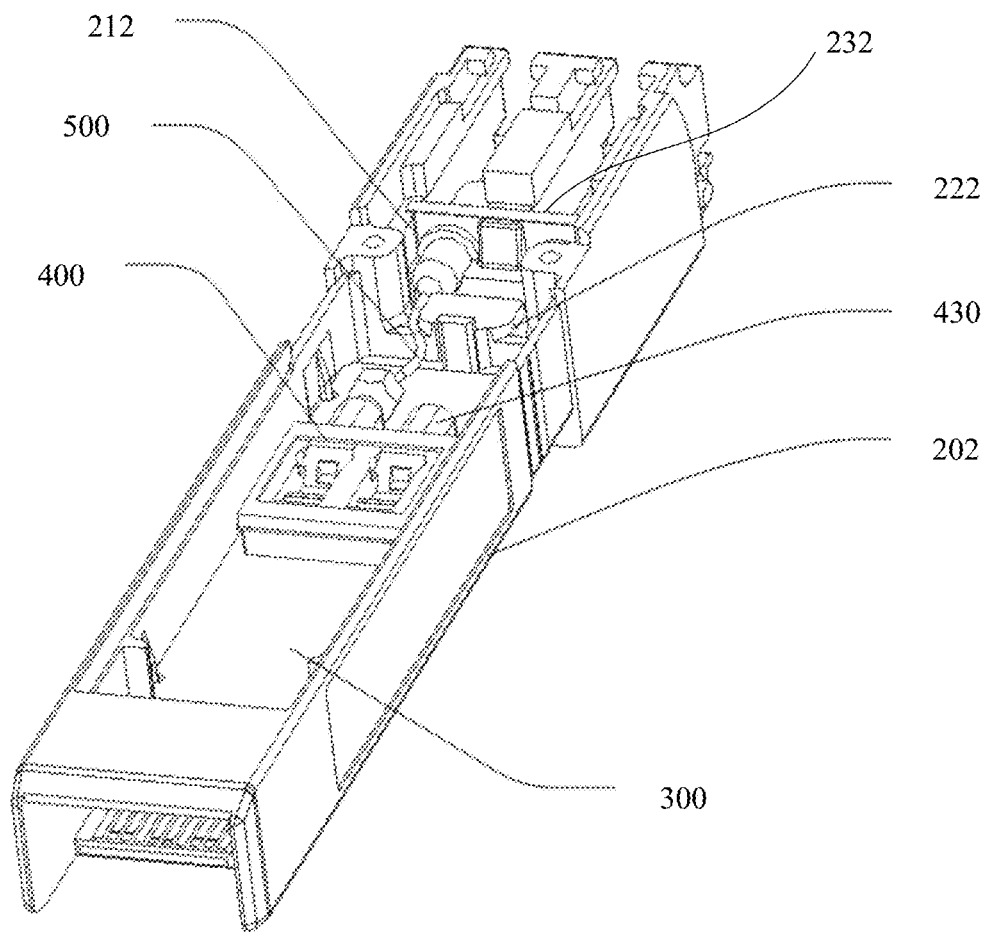
FIG. 23 is a structural diagram of an optical module with an upper shell removed, in accordance with some embodiments.
Figure 24:
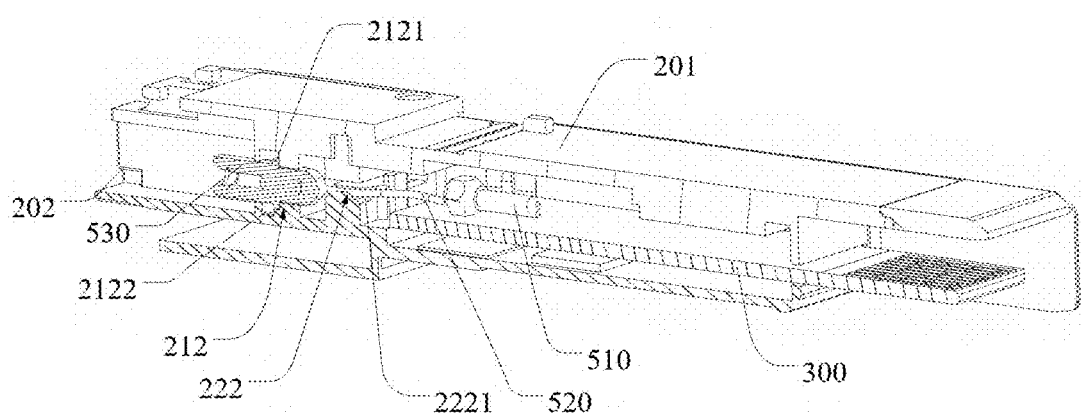
FIG. 24 is a cross-sectional view of an optical module with a lens assembly and chips removed, in accordance with some embodiments.
Figure 25:
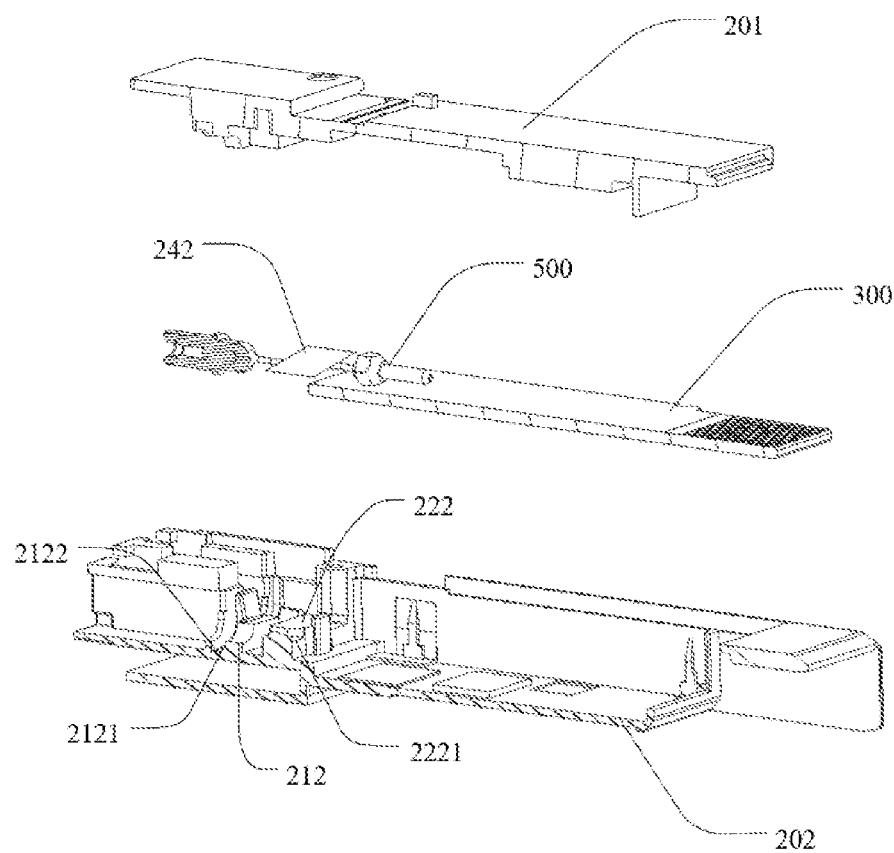
FIG. 25 is an exploded view of a cross-sectional view of an optical module with a lens assembly and chips removed, in accordance with some embodiments.

As shown in FIG. 20, the second bending segment 9103 includes a first arc plate 9103a and a second arc plate 9103b. A first end of the first arc plate 9103a is connected to a second end of the connecting segment 9102, and a second end of the first arc plate 9103a is connected to the second arc plate 9103b, and the first arc plate 9103a is abutted against a lower half portion of an end face of the sleeve base 511. In some embodiments, a portion of the sleeve base 511 proximate to the lower shell 202 of the optical module is referred to as the lower half portion, and the second arc plate 9103b abuts against the lower shell 202 of the optical module. According to the above design, the fastener 900 may be conveniently installed on the first optical fiber ferrule 510, and an end portion of the second bending segment 9103 may be prevented from scratching the first optical fiber ferrule 510; in addition, the second arc plate 9103*b* is supported by the lower shell 202 of the optical module, so that an installation position of the fastener 900 is determined.

A through hole 9104 may be disposed in the first bending segment 9101, or may be disposed in the second bending segment 9103, and is configured to allow the internal optical fiber 520 to pass through. The through hole may also be designed as a non-fully enclosed hole extending through the connecting segment 9102 from the second bending segment 9103 to the first bending segment 9101.

As shown in FIG. 17, the third bending segment 9201 is designed as a curved structure, and the third bending segment 9201 is bent toward the first clamping portion 910 to form a clamping force between the third bending segment 9201 and the first clamping portion 910. One end of the third bending segment 9201 is connected to the fastening body 930, and the other end of the third bending segment 9201 is connected to the fourth socket 9202. The fourth socket 9202 is designed as a flat plate structure, is formed by extending a tail end of the third bending segment 9201, and includes a notch 9203 configured to clamp onto the plugging portion 430 and abut against the positioning portion 460. An included angle between the fourth socket 9202 and the fastening body 930 is equal to or approximately equal to 90°, so that the fourth socket 9202 and the positioning portion 460 of the plugging portion 430 have a sufficient contact area therebetween; in addition, the fourth socket 9202 is connected to the fastening body 930 by the third bending segment 9201, so as to reduce stress between the fourth socket 9202 and the fastening body 930 and prevent breakage of the fourth socket 9202.

Based on the above design that the included angle between the fourth socket 9202 and the fastening body 930 is equal to or approximately equal to 90°, in order to enable the fourth socket 9202 to provide a sufficiently strong force for the positioning portion 460, the third bending segment 9201 is also designed in some embodiments of the present disclosure. As shown in FIG. 18, the third bending segment 9201 includes a third arc plate 9201*a* and a fourth arc plate 9201*b*. An arc opening of the third arc plate 9201*a* faces the first clamping portion 910, a first end of the third arc plate 9201*a* is connected to a second end of the fastening body 930, and a second end of the third arc plate 9201*a* is connected to a first end of the fourth arc plate 9201*b*; and an arc opening of the fourth arc plate 9201*b* faces away from the first clamping portion 910, and a second end of the fourth arc plate 9201*b* is connected to the fourth socket 9202. And a radian of the third arc plate 9201*a* is greater than a radian of the fourth arc plate 9201*b*, a corresponding central angle of the third arc plate 9201*a* is greater than 90° and less than 180°, and for example, it is designed as approximately 150° in some embodiment of the present disclosure.

Figure 19:
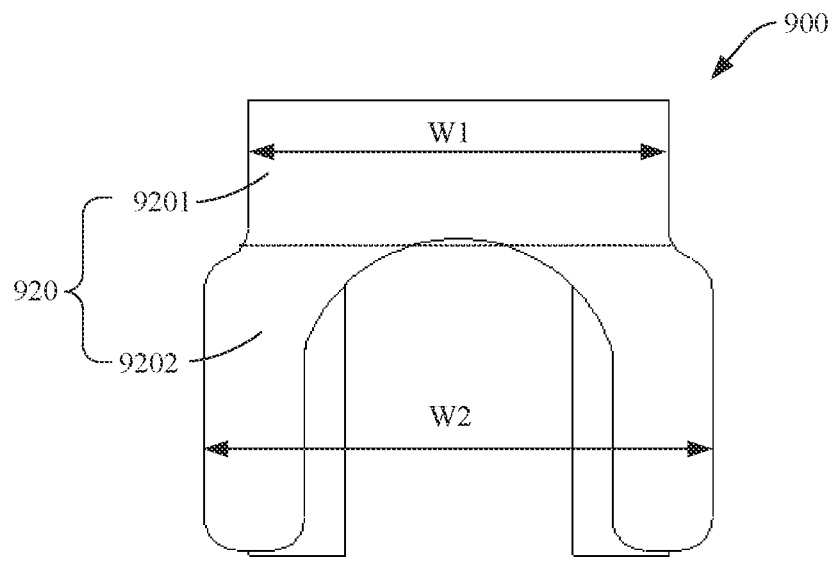
FIG. 19 is a side view of the fastener in FIG. 17.

Since the first optical fiber ferrule 510 is inserted into the plugging portion 430, an outer diameter of the plugging portion 430 is greater than the outer diameter of the first optical fiber ferrule 510, and a diameter of the notch 9203 of the fourth socket 9202 is also required to be large; and in order to ensure the contact area between the fourth socket 9202 and the positioning portion 460 as well as to take an internal space limitation of the optical module 200 into consideration, as shown in FIG. 19, a width W2 of the fourth socket 9202 is designed to be greater than a width W1 of the third bending segment 9201.

In some embodiments of the present disclosure, the positioning portion 460 on the plugging portion 430 is a protrusion protruding from the plugging portion 430; and the fourth socket 9202 is clamped on a side face of the plugging portion 430 and abuts against the protrusion, and the notch 9203 avoids the plugging portion 430.

In some embodiments of the present disclosure, the positioning portion 460 on plugging portion 430 may also be a recessed portion on a surface of the plugging portion 430, the notch on the fourth socket 9202 is clamped in the recessed portion.

In some embodiments of the present disclosure, the fastener 900 does not need additional components to tighten it, and thus as shown in FIG. 20, there is a certain gap L between an upper surface of the fastening body 930 of the fastener 900 and a lower surface of the upper shell 201 of the optical module 200. For example, the gap L is 0.01 mm. In this way, it is possible to prevent the fastener 900 from being pressed by the upper shell 201 of the optical module 200 to affect the transmission of the optical signal.

As shown in FIGS. 21 to 25, in some embodiments of the present disclosure, the optical module 200 further includes a first fixing assembly 212, a second fixing assembly 222 and a first shield plate 232 matched with the first fixing assembly 212, all of which are disposed on the lower shell 202 for fixing the optical fiber ferrule assembly 500.

The first fixing assembly 212 is disposed at an end of the lower shell 202 corresponding to the optical fiber adapter 530, and is configured to fix the optical fiber adapter 530. For example, the first fixing assembly 212 may be configured as a first concave component, and the optical fiber adapter 530 may be fixed in the first concave component.

An upper surface of the first concave component may be a smooth surface or an uneven surface. Both of first concave components of the two types of surfaces are able to fix the optical fiber adapter 530 to the lower shell 202. Therefore, the upper surface of the first concave component may be specifically designed according to actual conditions, and the present disclosure is not limited thereto.

A shape of a cross-section of the first concave component (perpendicular to a longitudinal direction of the optical fiber adapter 530) may be an arc, a rectangle, etc. For example, in a case where the shape of the optical fiber adapter 530 is a hollow cylinder, the shape of the cross-section of the first concave component is an arc; and in a case where the shape of the optical fiber adapter 530 is a hollow cuboid, the shape of the cross-section of the first concave component is a rectangle. That is, the shape of the optical fiber adapter 530 is matched with the shape of the cross-section of the first concave component.

The shape of the optical fiber adapter 530 is matched with the shape of the cross-section of the first concave component such that the optical fiber adapter 530 may fit as seamlessly as possible with the first concave component during use, which not only facilitates firm fixation of the optical fiber adapter 530 to the first fixing assembly 212, but also reduces wear of the optical fiber adapter 530.

The first fixing assembly 212 includes a third groove 2121 located on a surface of the first fixing assembly 212. The third groove 2121 is configured to clamp the clamping portion 531. The clamping portion 531 may be clamped into the third groove 2121, so as to fix the optical fiber adapter 530.

A shape of a cross section of the third groove 2121 (perpendicular to the longitudinal direction of the optical fiber adapter 530) may be designed as an arc or a rectangle. For example, in a case where the shape of the clamping portion 531 is a circular ring, the shape of the cross section of the third groove 2121 is an arc. That is, the shape of the clamping portion 531 is matched with the shape of the cross section of the third groove 2121.

The shape of the clamping portion 531 is matched with the shape of the cross section of the third groove 2121 such that the third groove 2121 may fit as seamlessly as possible with the clamping portion 531 during use, which not only facilitates firm clamping of the clamping portion 531 with the third groove 2121, but also reduces wear of the clamping portion 531.

The first fixing assembly 212 further includes a fourth groove 2122 located on a surface of the first fixing assembly 212. The fourth groove 2122 is configured to clamp the first shield plate 232. For example, the first shield plate 232 may be clamped into the fourth groove 2122.

A shape of a cross section of the fourth groove 2122 (perpendicular to the longitudinal direction of the optical fiber adapter 530) may be designed as an arc or a rectangle. For example, a shape of the first shield plate 232 is an arc, and the shape of the cross section of the fourth groove 2122 is an arc. That is, the shape of the first shield plate 232 is matched with the shape of the cross section of the fourth groove 2122.

The shape of the first shield plate 232 is matched with the shape of the cross section of the fourth groove 2122 such that the first shield plate 232 may fit as seamlessly as possible with the fourth groove 2122 during use, which not only facilitates firm clamping of the first shield plate 232 with the fourth groove 2122, but also reduces wear of the first shield plate 232.

The second fixing assembly 222 is disposed on the lower shell 202, and is configured to fix the internal optical fiber 520. For example, the second fixing assembly 222 includes a fifth groove 2221, and the fifth groove 2221 may fix the internal optical fiber 520 to the lower shell 202.

A shape of a cross section of the fifth groove 2221 (perpendicular to a longitudinal direction of the internal optical fiber 520) may be an arc, a rectangle, etc. For example, in a case where a shape of the internal optical fiber 520 is a cylinder, the shape of the cross section of the fifth groove 2221 is an arc; and in a case where the shape of the internal optical fiber 520 is a cuboid, the shape of the cross section of the fifth groove 2221 is a rectangle. That is, the shape of the internal optical fiber 520 is matched with the shape of the cross-section of the fifth groove 2221.

The shape of the internal optical fiber 520 is matched with the shape of the cross-section of the fifth groove 2221 such that the internal optical fiber 520 may fit as seamlessly as possible with the fifth groove 2221 during use, which not only facilitates firm fixation of the internal optical fiber 520 to the second fixing assembly 222, but also reduces wear of the internal optical fiber 520.

The first shield plate 232 is configured to fix the optical fiber adapter 530 to the first fixing assembly 212. For example, the first shield plate 232 includes a receptacle 2321 through which the optical fiber adapter 530 passes. During use, the optical fiber adapter 530 passes through the receptacle 2321 and the first shield plate 232 is clamped with the fourth groove 2122, so as to fix the optical fiber adapter 530 to the first fixing assembly 212. A material of the first shield plate 232 includes metal, which can shield signals.

The optical module further includes a second shield plate 242. The second shield plate 242 corresponds to the second fixing assembly 222, and is configured to shield an optical signal in the internal optical fiber 520. For example, the second shield plate 242 is fixed to the second fixing assembly 222. The second shield plate 242 cooperates with the second fixing assembly 222, which not only fixes the internal optical fiber 520 to the second fixing assembly 222, but also shields the optical signal in the internal optical fiber 520.

The number of optical fiber ferrule assemblies 500 is the same as the number of plugging portions 430. For example, in a case where the number of optical fiber ferrule assemblies 500 is one, the number of optical fiber adapters 530, internal optical fibers 520, first optical fiber ferrules 510 and plugging portions 430 is each one, and the number of third grooves 2121, fourth grooves 2122 and fifth grooves 2221 for fixing the above components is each one. In a case where the number of optical fiber ferrule assemblies 500 is two, the number of optical fiber adapters 530, internal optical fibers 520, first optical fiber ferrules 510 and plugging portions 430 is each two, and the number of third grooves 2121, fourth grooves 2122 and fifth grooves 2221 for fixing the above components is each two.

In some embodiments of the present disclosure, the optical fiber ferrule assembly 500 includes the internal optical fiber 520 connected to the first optical fiber ferrule 510 and the second optical fiber ferrule, and the second optical fiber ferrule is connected to the optical fiber adapter 530, and thus a probability of an unsmooth communication connection between the lens assembly 400 and the external optical fiber 101 may be reduced; the clamping portion 531 and the first shield plate 232 of the optical fiber adapter 530 are clamped with the third groove 2121 and the fourth groove 2122 on the lower shell 202 respectively, so that the optical fiber adapter 530 may be fixed to the lower shell 202, a probability of a poor communication effect between the optical fiber adapter 530 and the lens assembly 400 due to the fact that the optical fiber adapter 530 is easily shaken on the lower shell 202 is reduced, and the communication between the optical fiber adapter 530 and the lens assembly 400 is improved.

Figure 26:
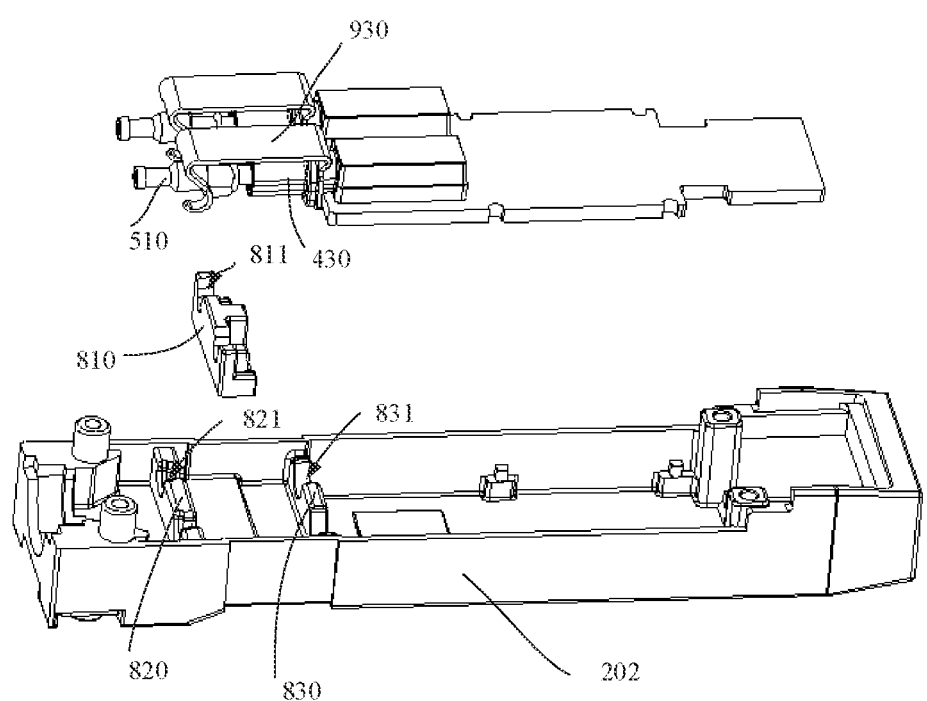
FIG. 26 is a diagram showing a disassembled structure of a lower shell, a first bracket and a circuit board, in accordance with some embodiments.
Figure 27:
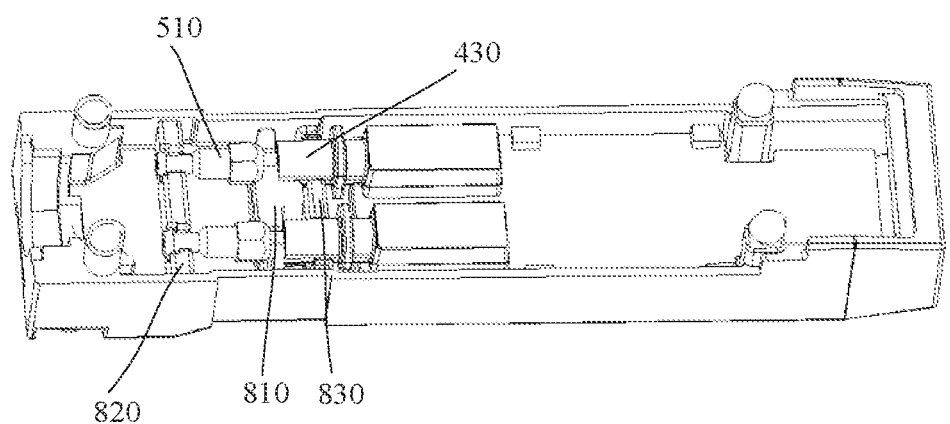
FIG. 27 is a diagram showing an assembled structure of a lower shell, a first bracket and a circuit board, in accordance with some embodiments.

In some embodiments, as shown in FIGS. 26 and 27, the optical module 200 includes a first bracket 810 disposed on the lower shell 202, and there is a certain gap between the sleeve base 511 and a port of the plugging portion 430, and the first bracket 810 is located in the gap. The first bracket 810 includes a groove 811 at the top thereof, a size of groove 811 is matched with a size of the first optical fiber ferrule 510. The first bracket 810 is detachably connected to the lower shell 202 of the optical module. During installation, the first bracket 810 is fixed to the first optical fiber ferrule 510 through the groove 811, and then the first bracket 810, the first optical fiber ferrule 510 and the plugging portion 430 are placed in the lower shell 202. Compared with a case where the first bracket 810 is fixedly connected to the lower shell 202, a case where the first bracket 810 is detachably connected to the lower shell 202 facilitates placement of the first optical fiber ferrule 510 and the plugging portion into the lower shell 202.

The first bracket 810 is designed to be detachable in some embodiments of the present disclosure, so that the plugging portion 430 and the lower shell 202 may be adapted to different sizes of first optical fiber ferrules 510. For example, when the sleeve base 511 is in contact with the plugging portion 430 or when a gap between the sleeve base 511 and the plugging portion 430 is changed, the first bracket 810 may not be used or the first bracket 810 with a corresponding size may be used, and thus the lower shell 202 and the plugging portion 430 do not need to be redesigned.

In order to further support and limit the first optical fiber ferrule 510 and the plugging portion 430, the optical module 200 further includes a second bracket 820 and a third bracket 830 that are disposed on the lower shell 202. The second bracket 820 and the third bracket 830 may be fixed together with the lower shell 202. The second bracket 820 includes a groove 821, a size of the groove 821 is matched with the size of the first optical fiber ferrule 510; and the third bracket 830 includes a groove 831, a size of the groove 831 is matched with a size of the plugging portion 430. During installation, the first optical fiber ferrule 510 is fixed in the groove 821 of the second bracket 820 and the groove 811 of the first bracket 810, and the plugging portion 430 is fixed in the groove 831 of the third bracket 830.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the scope of the present disclosure shall be subject to the protection scope of the claims.

What is claimed is:

1. An optical module, comprising:
   a shell;
   a circuit board disposed in the shell;
   a light-emitting chip disposed on the circuit board and configured to generate an optical signal;
   a lens assembly disposed on the circuit board, covering the light-emitting chip, and configured to change a propagation direction of the optical signal incident to the lens assembly from the light-emitting chip;
   an optical fiber ferrule assembly, wherein an end of the optical fiber ferrule assembly is connected to the lens assembly, and the optical fiber ferrule assembly is configured to transmit the optical signal incident to the optical fiber ferrule assembly from the lens assembly; and
   a fastener fixing the optical fiber ferrule assembly to the lens assembly, wherein
   the fastener includes:
      a fastening body;
      a first clamping portion disposed at an end of the fastening body and clamped with the optical fiber ferrule assembly; and
      a second clamping portion disposed at another end of the fastening body and clamped with the lens assembly;
   the lens assembly includes:
      a lens base configured to change a propagation direction of the optical signal incident into the lens base from the light-emitting chip;
      a plugging portion disposed at an end of the lens base and configured to allow the optical fiber ferrule assembly to be inserted; and
      a positioning portion disposed on an outer circumference of the plugging portion, wherein the first clamping portion is clamped with the first optical fiber ferrule and located on a side of the sleeve base away from the lens assembly;
   the optical fiber ferrule assembly includes:
      a first optical fiber ferrule disposed in the plugging portion;
      a second optical fiber ferrule;
      an internal optical fiber, an end of the internal optical fiber being connected to the first optical fiber ferrule, and another end of the internal optical fiber being connected to the second optical fiber ferrule;
      an optical fiber adapter, the second optical fiber ferrule disposed in the optical fiber adapter; and
      a sleeve base sleeved on an outer circumference of the first optical fiber ferrule, wherein the second clamping portion is clamped with the plugging portion and located on a side of the positioning portion away from the optical fiber ferrule assembly; and
   the first clamping portion includes:
      a first bending segment having a curved structure, a first end of the first bending segment being connected to a first end of the fastening body, and the first bending segment being bent downwards from the first end of the fastening body and in a direction away from the second clamping portion;
      a connecting segment having a flat plate structure, a first end of the connecting segment being connected to a second end of the first bending segment; and
      a second bending segment having a curved structure, a first end of the second bending segment being connected to a second end of the connecting segment, and the second bending segment being bent downwards from the second end of the connecting segment and in a direction close to the second clamping portion.

2. The optical module according to claim 1, wherein the second bending segment includes:
   a first arc plate, a first end of the first arc plate being connected to the second end of the connecting segment, and the first arc plate abutted against the sleeve base; and
   a second arc plate, a first end of the second arc plate being connected to a second end of the first arc plate, and the second arc plate abutted against the shell.

3. The optical module according to claim 1, wherein the second clamping portion includes:
   a third bending segment having a curved structure, a first end of the third bending segment being connected to a second end of the fastening body, and the third bending segment being bent towards the first clamping portion; and
   a fourth socket having a flat plate structure including a notch, a first end of the fourth socket being connected to a second end of the third bending segment, and the fourth socket being clamped with the plugging portion and abutted against the positioning portion.

4. The optical module according to claim 3, wherein the third bending segment includes:
   a third arc plate, an arc opening of the third arc plate facing the first clamping portion, and a first end of the third arc plate being connected to the second end of the fastening body; and
   a fourth arc plate, an arc opening of the fourth arc plate facing away from the first clamping portion, and a first end of the fourth arc plate being connected to a second end of the third arc plate and a second end of the fourth arc plate being connected to the fourth socket.

5. The optical module of claim 1, wherein the lens base includes a first groove disposed on a surface of the lens base away from the circuit board, and an inclined sidewall of the first groove provides a reflective surface configured to reflect the optical signal emitted by the light-emitting chip.

6. The optical module according to claim 5, wherein the lens base further includes:
   a first lens disposed on a surface of the lens base proximate to the circuit board and corresponding to a position of the light-emitting chip; and
   a second lens disposed on a surface of the lens base facing the optical fiber ferrule assembly and corresponding to a position of the optical fiber ferrule assembly;

the optical signal emitted by the light-emitting chip is incident on the reflective surface after being collimated by the first lens, is incident to the second lens after being reflected by the reflective surface, and is incident to the optical fiber ferrule assembly after being focused by the second lens.

7. The optical module according to claim 6, further comprising:
a light-receiving chip disposed on the circuit board, covered by the lens assembly and configured to receive an optical signal from the optical fiber ferrule assembly; and
the lens base further including:
a second groove disposed on a surface of the lens base away from the circuit board, and closer to the optical fiber ferrule assembly than the first groove; and
an optical filter obliquely disposed in the second groove, and configured to reflect the optical signal from the optical fiber ferrule assembly and transmit the optical signal emitted by the light-emitting chip.

8. The optical module according to claim 7, wherein the lens base further includes:
a third lens disposed on the surface of the lens base proximate to the circuit board and corresponding to a position of the light-receiving chip; and
the optical signal from an outside of the optical module is incident to the second lens through the optical fiber ferrule assembly, is incident to the optical filter after being collimated by the second lens, is incident to the third lens after being reflected by the optical filter, and is incident to the light-receiving chip after being focused by the third lens.

9. The optical module according to claim 1, wherein the shell includes a lower shell; and
the optical module further comprises a first fixing assembly disposed on the lower shell and fixing the optical fiber adapter.

10. The optical module according to claim 9, wherein the optical fiber ferrule assembly includes a clamping portion sleeved on an outer circumference of the optical fiber adapter, the first fixing assembly includes a third groove disposed on a surface thereof, and the clamping portion is clamped with the third groove.

11. The optical module according to claim 9, further comprising a first shield plate having a receptacle through which the optical fiber adapter passes; and
the first fixing assembly including a fourth groove disposed on a surface thereof, and the first shield plate is clamped with the fourth groove.

12. The optical module according to claim 9, further comprising:
a second fixing assembly disposed on the lower shell, the second fixing assembly including a fifth groove fixing the internal optical fiber; and
a second shield plate fixed on the second fixing assembly and shielding an optical signal of the internal optical fiber.

13. The optical module according to claim 1, wherein the shell includes a lower shell, and the optical fiber ferrule assembly further includes a sleeve base sleeved on an outer circumference of the first optical fiber ferrule;
the optical module further comprises a first bracket disposed on the lower shell and located between the sleeve base and the plugging portion; and
the first bracket has a groove matched with a size of the first optical fiber ferrule, and the first optical fiber ferrule is fixed in the groove of the first bracket.

14. The optical module according to claim 13, further comprising:
a second bracket disposed on the lower shell, the second bracket being located on a side of the sleeve base away from the plugging portion and having a groove matched with the size of the first optical fiber ferrule, and the first optical fiber ferrule being fixed in the groove of the second bracket;
and/or,
a third bracket disposed on the lower shell, the third bracket having a groove matched with a size of the plugging portion, and the plugging portion being fixed in the groove of the third bracket.

\* \* \* \* \*